United States Patent
Park et al.

(10) Patent No.: US 11,489,581 B2
(45) Date of Patent: Nov. 1, 2022

(54) METHOD FOR SENSING RF SIGNAL AND ELECTRONIC DEVICE FOR EXECUTING SAME

(71) Applicant: Samsung Electronics Co., Ltd., Gyeonggi-do (KR)

(72) Inventors: Sungchul Park, Gyeonggi-do (KR); Suha Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/283,059

(22) PCT Filed: Oct. 10, 2019

(86) PCT No.: PCT/KR2019/013290
§ 371 (c)(1),
(2) Date: Apr. 6, 2021

(87) PCT Pub. No.: WO2020/076092
PCT Pub. Date: Apr. 16, 2020

(65) Prior Publication Data
US 2021/0384961 A1 Dec. 9, 2021

(30) Foreign Application Priority Data

Oct. 11, 2018 (KR) .......................... 10-2018-0120822

(51) Int. Cl.
*H04B 7/10* (2017.01)
*H01Q 3/24* (2006.01)
(Continued)

(52) U.S. Cl.
CPC ................. *H04B 7/10* (2013.01); *H01Q 3/24* (2013.01); *H01Q 3/26* (2013.01); *H04B 7/08* (2013.01); *H04M 1/026* (2013.01)

(58) Field of Classification Search
CPC ... H04B 7/10; H04B 7/08; H01Q 3/24; H01Q 3/26; H04M 1/026
See application file for complete search history.

(56) References Cited

U.S. PATENT DOCUMENTS

| 9,667,290 B2 | 5/2017 | Ouyang et al. |
| 9,787,382 B2 | 10/2017 | Tujkovic et al. |

(Continued)

FOREIGN PATENT DOCUMENTS

| JP | 2011-064584 A | 3/2011 |
| JP | 2015-019288 A | 1/2015 |
| JP | 2016-152507 A | 8/2016 |

OTHER PUBLICATIONS

European Search Report dated Oct. 14, 2021.

*Primary Examiner* — Junpeng Chen
(74) *Attorney, Agent, or Firm* — Cha & Reiter, LLC

(57) ABSTRACT

An electronic device, according to various embodiments of the present invention, is disclosed, comprising: an antenna array including a plurality of antenna elements disposed at intervals of a first distance; and a communication circuit electrically connected with the antenna array, wherein the communication circuit is configured to: supply power to a first antenna element and a second antenna element spaced apart from the first antenna element by a second distance among the plurality of antenna elements; form a beam comprising a main lobe and a grating lobe having a predetermined angle with the main lobe, by using the first antenna element and the second antenna element; and sense an RF signal incident from the outside by using the formed beam. Various other embodiments inferred from the present specification are also possible.

12 Claims, 21 Drawing Sheets

(51) Int. Cl.
*H01Q 3/26* (2006.01)
*H04B 7/08* (2006.01)
*H04M 1/02* (2006.01)

(56) References Cited

U.S. PATENT DOCUMENTS

| | | |
|---|---|---|
| 10,084,490 B2 | 9/2018 | Ouyang et al. |
| 2002/0039912 A1* | 4/2002 | Yamaguchi .......... H01Q 3/2605 |
| | | 455/562.1 |
| 2011/0063158 A1 | 3/2011 | Kondou |
| 2015/0215054 A1* | 7/2015 | Piazza .................... H04B 17/15 |
| | | 455/115.1 |
| 2015/0222013 A1* | 8/2015 | Choi ....................... H04B 7/02 |
| | | 343/879 |
| 2016/0006121 A1* | 1/2016 | El-Sallabi ................ H01Q 3/24 |
| | | 342/443 |
| 2016/0033614 A1 | 2/2016 | Wang et al. |
| 2016/0087349 A1* | 3/2016 | Lee .......................... H01Q 5/42 |
| | | 342/373 |
| 2016/0308563 A1 | 10/2016 | Ouyang et al. |
| 2016/0365900 A1* | 12/2016 | Kim ....................... H04B 7/088 |
| 2017/0207840 A1 | 7/2017 | Tujkovic et al. |
| 2017/0302306 A1 | 10/2017 | Ouyang et al. |
| 2018/0175502 A1 | 6/2018 | Miyagawa |
| 2019/0020365 A1 | 1/2019 | Ouyang et al. |

* cited by examiner

METHOD FOR SENSING RF SIGNAL AND ELECTRONIC DEVICE FOR EXECUTING SAME

CROSS REFERENCE TO RELATED APPLICATIONS

This application is a National Phase Entry of PCT International Application No. PCT/KR2019/013290, which was filed on Oct. 10, 2019, and claims a priority to Korean Patent Application No. 10-2018-0120822, which was filed on Oct. 11, 2018, the contents of which are incorporated herein by reference.

TECHNICAL FIELD

Embodiments of the present disclosure relate to a method for sensing an RF signal and an electronic device for performing the same.

BACKGROUND ART

With the development of information technology (IT), various types of electronic devices are widely disseminated. The electronic devices may wirelessly communicate with other electronic devices or base stations using an antenna.

Recently, due to a rapid increase in network traffic caused by mobile devices, a 5th generation mobile communication (5G) technology which uses ultra-high frequency band signals has been developed. If ultra-high frequency band signals are used, the wavelengths of signals may decrease to a millimeter level, and the size of an antenna may be easily reduced. Furthermore, since a wider bandwidth may be used, a larger amount of information may be transmitted or received. An antenna array has effective isotropically radiated power (EIRP) higher than that of a single antenna, and thus may transmit/receive a variety of data more efficiently. The ultra-high frequency band signal may be referred to as a millimeter wave signal.

DISCLOSURE OF THE INVENTION

Technical Problem

A millimeter wave signal may have strong straightness. An electronic device may communication through the millimeter wave signal by changing a beam angle to a direction in which the millimeter wave signal is incident. For example, the electronic device may perform communication using a beamforming technique.

When the electronic device is unable to recognize the direction in which the millimeter wave signal is incident, the electronic device may perform an operation of sensing the millimeter wave signal before performing communication. For example, the electronic device may sense the millimeter wave signal by activating antenna elements included in an antenna array. For example, the electronic device may form a beam in a specified direction using the antenna elements, and may track the millimeter wave signal while changing the direction of the beam by a specified angle each time.

The electronic device may activate all of the antenna elements included in the antenna array to track the millimeter wave signal. In this case, the electronic device may form a beam having a high gain and may track the millimeter wave signal. In this manner, the electronic device may sense a signal transmitted from a long distance away, but a region in which the signal can be sensed may be relatively narrow since the shape of the formed beam is sharp. For example, the method described above may be relatively inefficient to track the incidence direction of a millimeter wave signal. Furthermore, in this case, since the number of activated antenna elements is large, the power consumption of the electronic device may be relatively high.

Embodiments of the present disclosure provide an electronic device, which tracks the incidence direction of the millimeter wave signal by forming a beam including a main lobe and a grating lobe, in order to solve the above-mentioned problem and achieve objects of the present disclosure.

Technical Solution

An electronic device according to an embodiment of the present disclosure may be characterized by including an antenna array including a plurality of antenna elements arranged at an interval of a first distance, and a communication circuit electrically connected to the antenna array, wherein the communication circuit is configured to feed a first antenna element and a second antenna element spaced a second distance apart from the first antenna element among the plurality of antenna elements, form a beam including a main lobe and a grating lobe that forms a specified angle with the main lobe using the first antenna element and the second antenna element, and sense an RF signal that is incident externally using the formed beam.

Furthermore, a method for sensing an RF signal according to an embodiment of the present disclosure may be characterized by including feeding a first antenna element and a second antenna element spaced a second distance apart from the first antenna element among a plurality of antenna elements included in an antenna array, forming a beam including a main lobe and a grating lobe that forms a specified angle with the main lobe using the first antenna element and the second antenna element, and sensing an RF signal that is incident externally using the formed beam.

Furthermore, an electronic device according to another embodiment of the present disclosure may be characterized by including a housing, a wireless communication circuit configured to transmit and/or receive a signal having a first wavelength using beamforming, and an antenna array arranged inside the housing and/or at a portion thereof and electrically connected to the wireless communication circuit, wherein the antenna array includes a first antenna element, a second antenna element, and a third antenna element, which are sequentially aligned in one direction, wherein two adjacent antenna elements among the first to third antenna elements are spaced a distance that is equal to or shorter than the first wavelength apart from each other, and wherein the wireless communication circuit is further configured to perform first receive beam sweeping using the first antenna element and the third antenna element other than the second antenna element, and perform initial beam training by performing second receive beam sweeping using the second antenna element and either the first or third antenna element after performing the first receive beam sweeping.

Advantageous Effects

According to embodiments of the present disclosure, an electronic device may efficiently sense a direction in which a millimeter wave signal is incident. For example, the electronic device may more quickly sense the direction in which the signal is incident, and may also reduce power consumption. Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Figure 1A:
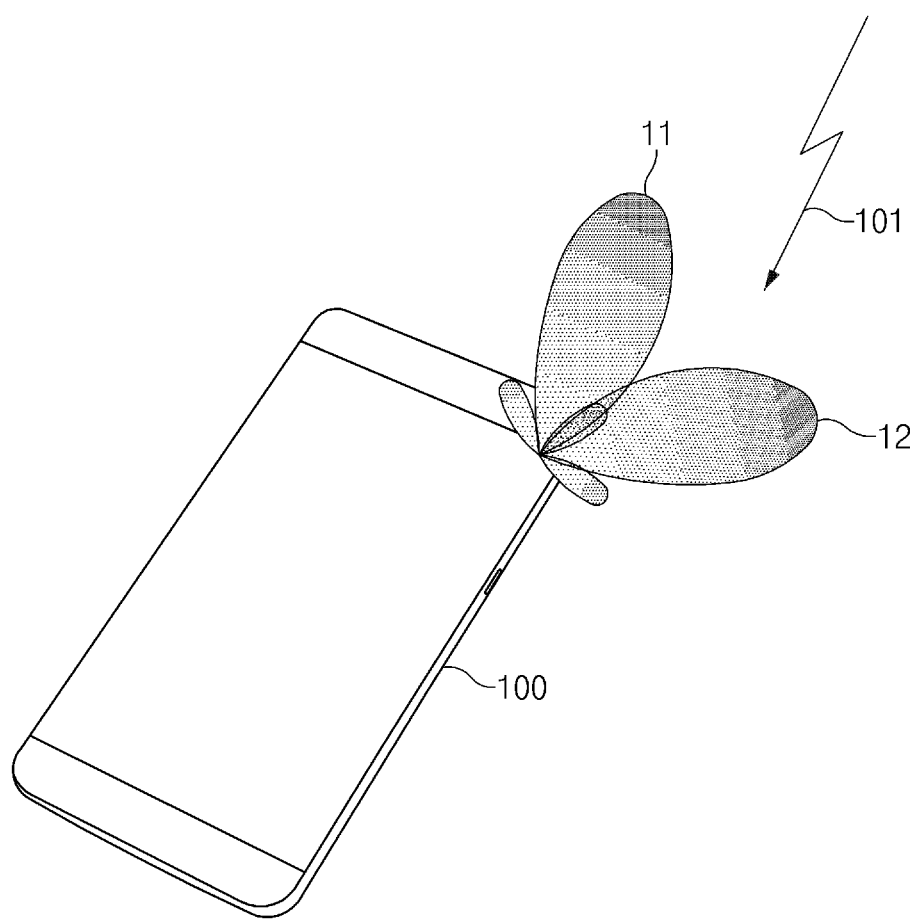
FIG. 1A illustrates an electronic device which forms a beam in order to receive an RF signal according to an embodiment.

FIG. 1A illustrates an electronic device which forms a beam in order to receive an RF signal according to an embodiment.

Referring to FIG. 1A, an electronic device 100 may form at least one beam and may receive an RF signal 101 that is incident externally. According to an embodiment, the at least one beam may be formed to have intensity of at least a specified level in a plurality of directions. For example, the at least one beam may include a main lobe 11 and a grating lobe 12 oriented in a direction different from that of the main lobe 11. The main lobe 11 and the grating lobe 12 may have intensity of at least a specified level.

According to an embodiment, the main lobe 11 and the grating lobe 12 may form a specified angle. The electronic device 100 may change directions of the main lobe 11 and the grating lobe 12, which form the specified angle, in order to sense the RF signal 101. In an embodiment, the electronic device 100 may change a direction of the beam including the main lobe 11 and the grating lobe 12 by a specified angle each time.

According to an embodiment, if the direction of the main lobe 11 or the direction of the main lobe 12 is substantially aligned with a direction of the RF signal 101, the electronic device 100 may sense the RF signal 101. The electronic device 100 may determine the direction of the sensed RF signal 101 and may receive the RF signal 101.

Figure 1B:
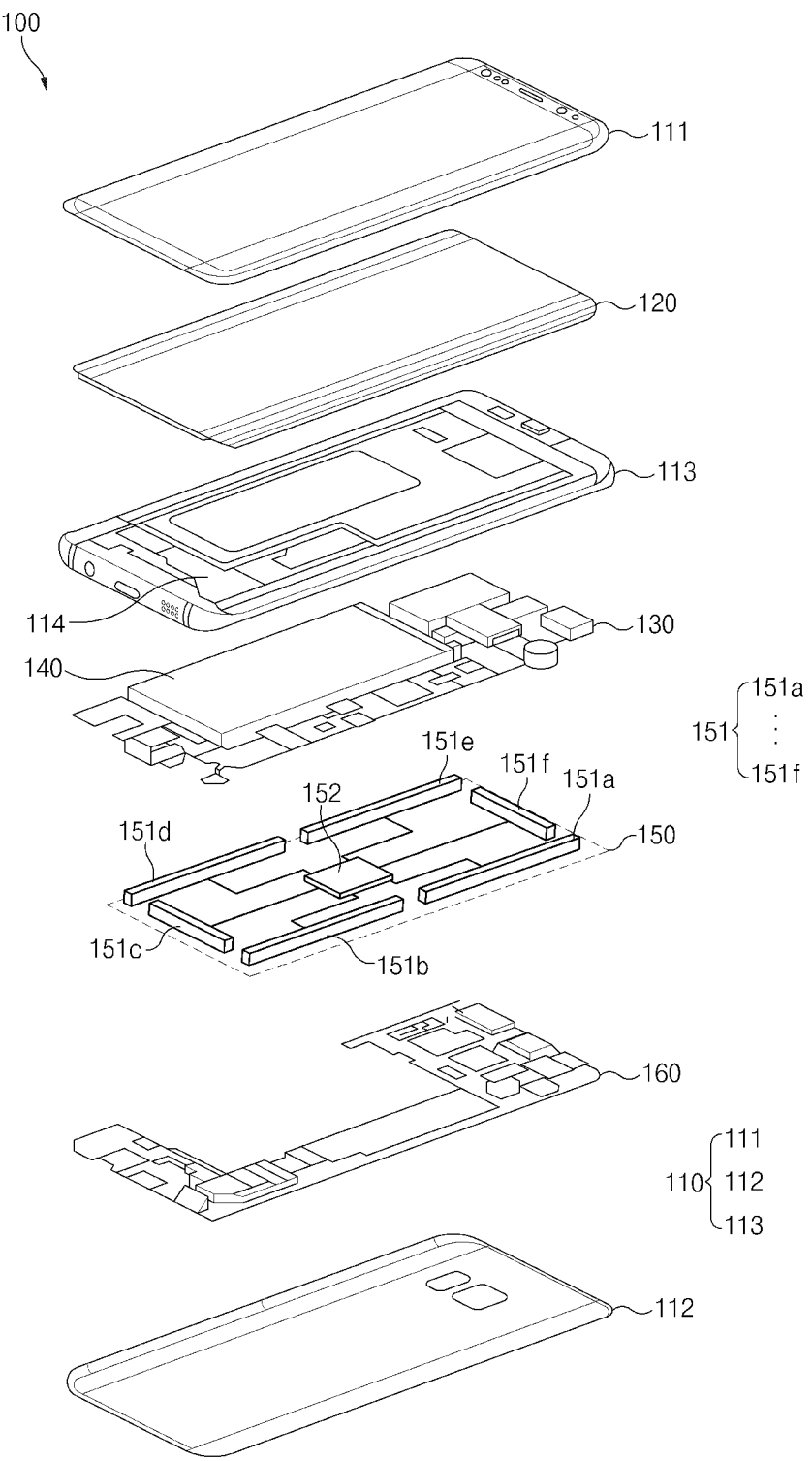
FIG. 1B illustrates an exploded perspective view of an electronic device according to an embodiment.

FIG. 1B illustrates an exploded perspective view of an electronic device according to an embodiment.

Referring to FIG. 1B, the electronic device 100 may include a cover glass 111, a rear cover 112, a side bezel structure 113, a first support member 114 (e.g., a bracket), a display 120, a printed circuit board 130, a battery 140, a communication system 150, and/or a second support member 160 (e.g., a rear case). In an embodiment, the electronic device 100 may not be provided with a portion (e.g., the first support member 114 or the second support member 160) of the components illustrated in FIG. 1, or may further include other components not shown in FIG. 1.

According to an embodiment, the cover glass 111, the rear cover 112, and the side bezel structure 113 may be combined with each other to form a housing 110. The housing 110 may form an exterior of the electronic device 100, and may protect internal components of the electronic device 100 from an external impact.

According to an embodiment, the housing 110 may include a front side, a rear side oriented in an opposite direction to the front side, and a side surrounding a space between the front side and the rear side. For example, the side may be formed as the side bezel structure 113. For another example, the side may include a first side and a second side. The first side may be regarded as a region bent and extending in a direction from the front side to the rear side. The second side may be regarded as a region bent and extending in a direction from the rear side to the front side.

According to an embodiment, the front side and the first side extending from the front side may be formed as the cover glass 111, and the rear side and the second side extending from the rear side may be formed as the rear cover 112. According to another embodiment, the front side may be formed as the cover glass 111, and the rear side, the first side, and the second side may be formed as the rear cover 112.

The first support member 114 may be disposed in the electronic device 100 and connected to the side bezel structure 113 or integrated with the side bezel structure 113. In an embodiment, the first support member 114 may support or fix, in a direction of the cover glass 111, electronic components arranged in the electronic device 100, for example, the printed circuit board 130, electronic components arranged on the printed circuit board 130, or various modules for performing various functions.

According to an embodiment, the display 120 may be arranged between the cover glass 111 and the rear cover 112. The display 120 may be electrically connected to the printed circuit board 130 to output content (e.g., text, image, video, icon, widget, symbol, or the like) or receive a touch input (e.g., touch, gesture, hovering, or the like) from a user.

According to an embodiment, the printed circuit board 130 may be mounted with various electronic components, elements, or printed circuits of the electronic device 100. For example, the printed circuit board 130 may be mounted with an application processor (AP), a communication processor (CP), a memory, or the like. In the present disclosure, the printed circuit board 130 may be referred to as a first printed circuit board (PCB), a main PCB, a main board, or a printed board assembly (PBA).

According to an embodiment, the battery 140 may convert chemical energy into electrical energy and vice versa. For example, the battery 140 may convert chemical energy into electrical energy, and may supply the electrical energy to the display 120 and various components or modules mounted on the printed circuit board 130. According to an embodiment, the printed circuit board 130 may include a power management module for managing charging and discharging of the battery 140.

According to an embodiment, the communication system 150 may be arranged between the printed circuit board 130 and the rear cover 112. According to an embodiment, an adhesive material may be arranged between the communication system 150 and the rear cover 112, and the communication system 150 may be attached to the rear cover 112. In the present disclosure, the communication system 150 may be referred to as a "5G communication module".

According to an embodiment, the communication system 150 may include a communication module 152 and at least one of a first communication device 151a, a second communication device 151b, a third communication device 151c, a fourth communication device 151d, a fifth communication device 151e, or a sixth communication device 151f. According to various embodiments, the communication system 150 is not limited to that illustrated in FIG. 1B. For example, the number of communication devices 151 included in the communication system 150 may differ from the number of communication devices illustrated in FIG. 1B, and the communication devices 151 may be arranged in a different form from that illustrated in FIG. 1B.

According to an embodiment, the communication module 152 may be electrically connected to the communication devices 151 to feed the communication devices 151. In an embodiment, the communication module 152 may communicate with an external electronic device or base station through a millimeter wave signal by transmitting or receiving a specified signal to or from the communication devices 151. The millimeter wave signal, for example, may be regarded as a radio frequency (RF) signal having a millimeter-level wavelength or a frequency of 3 GHz to 100 GHz band.

According to an embodiment, the communication devices 151 may include the plurality of communication devices 151a, 151b, 151c, 151d, 151e, and 151f. According to an embodiment, the communication devices 151 may be arranged adjacent to an edge of the electronic device 100, for example, a side of the housing 110. For example, as illustrated in FIG. 1B, in the case where the housing 110 has a rectangular shape or substantially rectangular shape, at least one of the communication devices 151 may be arranged adjacent to each face of the housing 110. For another example, in the case where the housing 110 has a circular shape, the communication devices 151 may include a plurality of communication devices 151 arranged a specified distance apart from a center of the circular shape towards the side. According to various embodiment, unlike the above descriptions, the electronic device 100 may include only one of the plurality of communication devices 151a, 151b, 151c, 151d, 151e, and 151f rather than the communication devices 151.

In an embodiment, the communication devices 151 may radiate a millimeter wave signal towards the outside of the electronic device 100 or may receive a millimeter wave signal that is incident externally. The electronic device 100 may communicate with a base station or external electronic device through the millimeter wave signal.

According to an embodiment, the communication devices 151 may include an antenna array including a plurality of antenna elements. According to an embodiment, each of the antenna elements included in the antenna array may form a beam having omni-directionality in a free space. The free space, for example, may be regarded as a space including only a dielectric having a dielectric constant of 1.

According to an embodiment, the beam formed by the antenna array may have directivity in a particular direction. For example, the beam may have directivity in a particular direction due to mutual influences between the plurality of antenna elements and various components arranged in the electronic device 100. For example, the beam may have directivity in a direction of a side of the housing 110 in the electronic device 100. If the antenna array forms a beam having directivity in a particular direction, the electronic device 100 may have improved communication performance in the particular direction.

In an embodiment, the communication module 152 may change a direction of the beam formed by the antenna array. For example, the communication module 152 may adjust a phase of a signal radiated from each antenna element. The direction of the beam may be changed based on a phase difference between signals radiated from the antenna elements.

According to an embodiment, the antenna array included in the communication devices 151 may include a dipole antenna. According to an embodiment, the electronic device 100 may further include a patch antenna electrically connected to the communication module 152. For example, the communication devices 151 may further include a patch antenna array.

In an embodiment, the patch antenna array may radiate a millimeter wave signal in a direction different from (e.g., direction perpendicular to) a direction in which a dipole antenna array radiates. For example, the dipole antenna array may radiate a millimeter wave signal towards a side of the housing 110, and the patch antenna array may radiate a millimeter wave signal towards a front side or rear side of the housing 110.

According to an embodiment, the dipole antenna array may radiate a signal including a first frequency band, and the patch antenna array may radiate a signal including a second frequency band. According to an embodiment, the first frequency band and the second frequency band may be the same.

The second support member 160 may be arranged between the rear cover 112 and the printed circuit board 130. According to an embodiment, the second support member 160 may support or fix, in a direction of the rear cover 112, electronic components arranged in the electronic device 100 in a similar manner or the same manner as the first support member 114.

In the present disclosure, the descriptions provided with reference to FIG. 1B may be applied equally to components assigned the same reference signs as the components of the electronic device 100 illustrated in FIG. 1B.

Figure 2A:
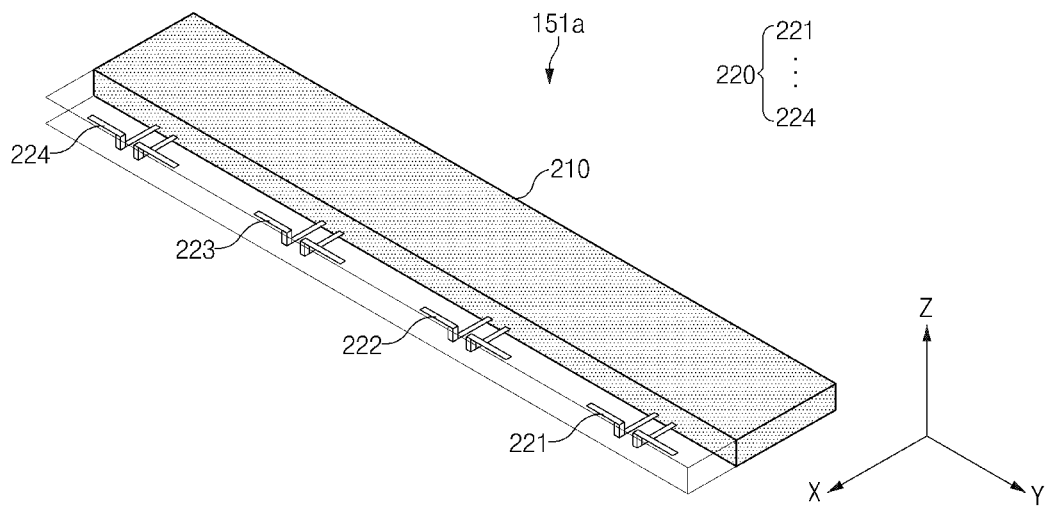
FIG. 2A illustrates a perspective view of a communication device included in an electronic device according to an embodiment.
Figure 2B:
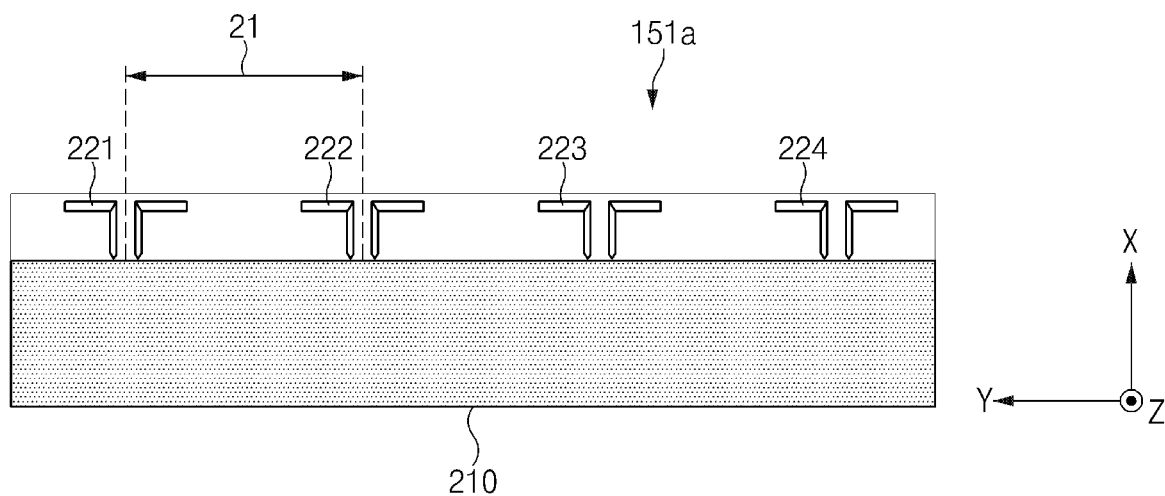
FIG. 2B illustrates a plan view of a communication device included in an electronic device according to an embodiment.

FIG. 2A illustrates a perspective view of a communication device included in an electronic device according to an embodiment. FIG. 2B illustrates a plan view of a communication device included in an electronic device according to an embodiment. In FIGS. 2A and 2B, the Z-axis direction may indicate, for example, a direction of the front side of the housing 110 illustrated in FIG. 1B.

Referring to FIGS. 2A and 2B, the communication device 151a may include a printed circuit board (PCB) 210 and a plurality of antenna elements 221, 222, 223, and 224. The plurality of antenna elements 221, 222, 223, and 224 may form an antenna array 220. In various embodiments, the number of antenna elements may be different from the number of antenna elements illustrated in FIGS. 2A and 2B. For example, the antenna array 220 may include eight antenna elements.

According to an embodiment, the printed circuit board 210 may be mounted with the plurality of antenna elements 221, 222, 223, and 224. For example, the plurality of antenna elements 221, 222, 223, and 224 may be arranged at a specified interval on one end of the printed circuit board 210. In the present disclosure, the printed circuit board 210 may be referred to as a "5G module PCB" or a second PCB.

According to an embodiment, wirings for feeding the plurality of antenna elements 221, 222, 223, and 224 may be arranged on the printed circuit board 210. Due to the wirings, the plurality of antenna elements 221, 222, 223, and 224 may be electrically connected to a communication circuit (e.g., the communication circuit 1130 of FIG. 11) included in the communication device 151, and may be fed by the communication circuit.

According to an embodiment, the antenna elements 221, 222, 223, and 224 may be fed from the communication circuit and may form a beam for radiating a millimeter wave signal. According to an embodiment, the antenna elements 221, 222, 223, and 224 may be dipole antennas. According to another embodiment, the antenna elements 221, 222, 223, and 224 may be monopole antennas unlike those illustrated in FIGS. 2A and 2B.

According to an embodiment, at least a portion of the antenna elements 221, 222, 223, and 224 may be arranged at an interval of a first distance 21. In an embodiment, the antenna elements 221, 222, 223, and 224 may be arranged at the same interval of the first distance 21. For example, the first distance 21 may be substantially the same as half of a wavelength of a millimeter wave signal such as an RF signal that is incident externally. For another example, the first distance 21 may be substantially the same as one third or one fourth of the wavelength of the RF signal.

The shape and configuration of the communication device 151a or the number, interval, or positions of the antenna elements 221, 222, 223, and 224 illustrated in FIGS. 2A and 2B are examples, and embodiments of the present invention are not limited to the illustrations of FIGS. 2A and 2B. Furthermore, in the present disclosure, the descriptions of the communication device 151a illustrated in FIGS. 2A and 2B may also be applied equally or similarly to the second to sixth communication devices 151b to 151f.

Furthermore, the descriptions provided with reference to FIGS. 2A and 2B may be applied equally to components assigned the same reference signs as the components of the communication device 151a illustrated in FIGS. 2A and 2B.

Figure 3A:
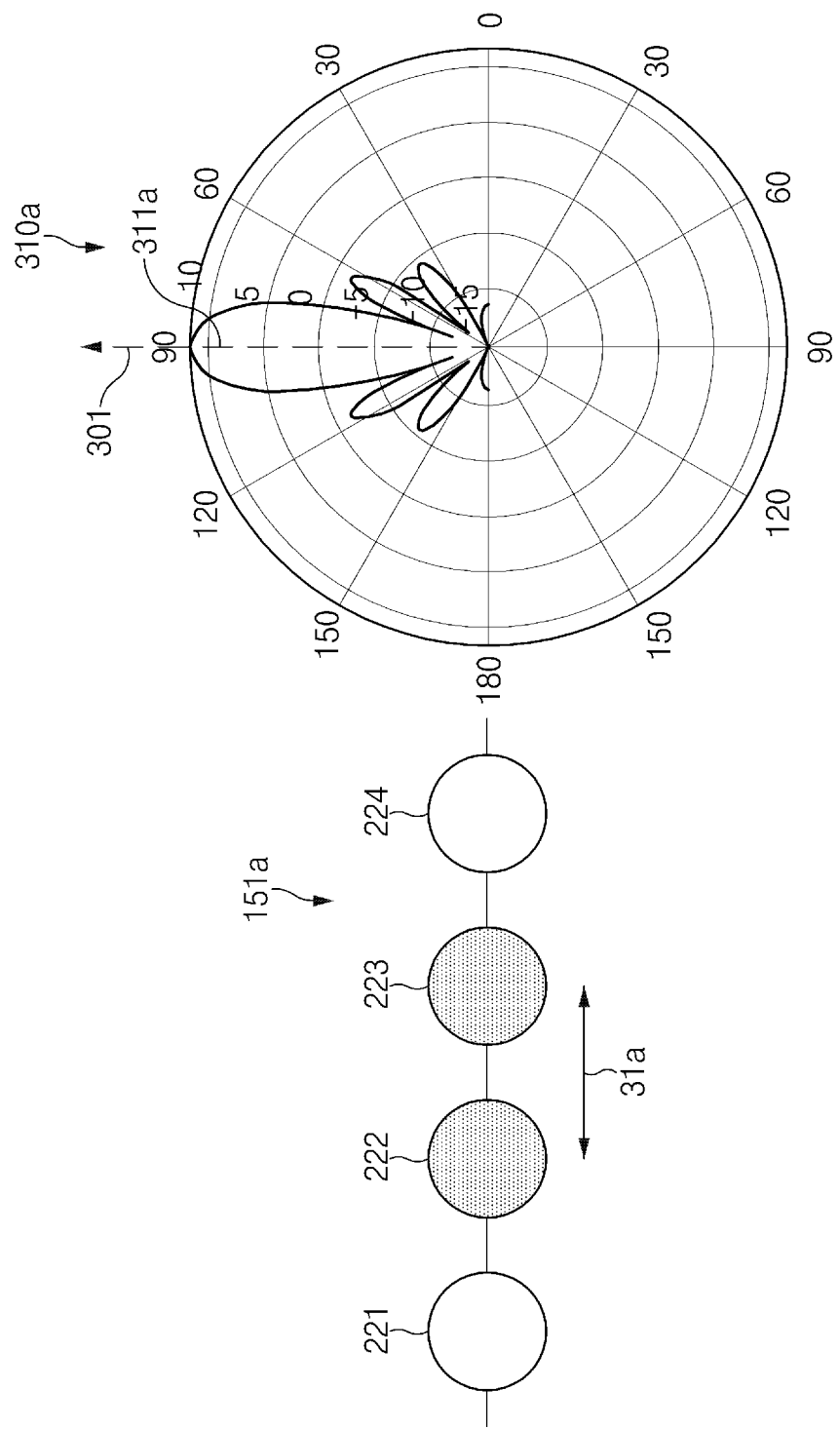
FIG. 3A illustrates a communication device and a shape of a beam generated by the communication device according to an embodiment.

FIG. 3A illustrates a communication device and a shape of a beam generated by the communication device according to an embodiment.

FIG. 3A illustrates the communication device 151a according to an embodiment and a first graph 310a showing a shape of a beam formed by the communication device 151a. According to an embodiment, the communication module 152 may activate at least a portion of the antenna elements 221, 222, 223, and 224 included in the communication device 151a and may deactivate the other portion. In an embodiment, the communication module 152 may activate a plurality of antenna elements 222 and 223 spaced a first distance 31a apart among the antenna elements 221, 222, 223, and 224.

For example, as illustrated in FIG. 3A, the communication module 152 may activate the second antenna element 222 and the third antenna element 223 and may deactivate the first antenna element 221 and the fourth antenna element 224. In the present disclosure, activating an antenna element may indicate that the antenna element is fed by the communication module 152, and deactivating an antenna element may indicate that the antenna element is not fed by the communication module 152.

According to an embodiment, the first distance 31a between the antenna elements 222 and 223 activated by the communication module 152 may be equal to the first distance 21 illustrated in FIG. 2B. For example, the first distance 31a may be substantially the same as half of a wavelength of an RF signal that is incident externally.

The first graph 310a may show a shape of a beam formed when the distance between the activated antenna elements 222 and 223 is the first distance 31a. Referring to the first graph 310a, the beam may include a main lobe 311a formed in a first direction 301. The beam may have a gain lower than a specified level for directions other than the first direction 301.

According to an embodiment 152, the communication module 152 may change a direction of the beam. For example, the communication module 152 may change the direction of the beam, for example, the direction of the main lobe 311a, by changing phases of signals received by activated antenna elements, for example, the second antenna element 222 and the third antenna element 223.

Figure 3B:
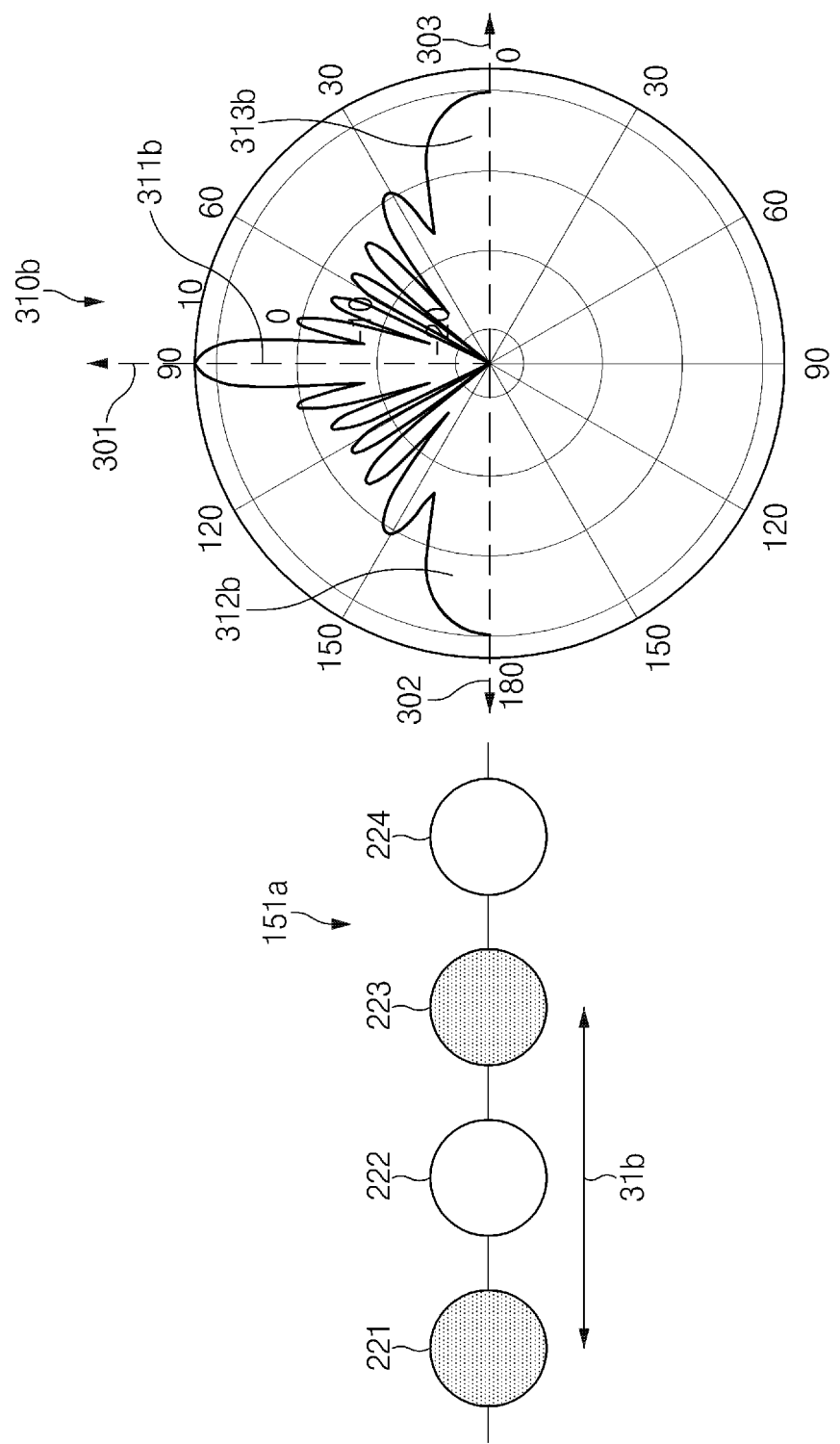
FIG. 3B illustrates a communication device and a shape of a beam generated by the communication device according to another embodiment.

FIG. 3B illustrates a communication device and a shape of a beam generated by the communication device according to another embodiment.

FIG. 3B illustrates the communication device 151a according to an embodiment and a second graph 310b showing a shape of a beam formed by the communication device 151a. According to an embodiment, the communication module 152 may activate at least a portion of the antenna elements 221, 222, 223, and 224 included in the communication device 151a and may deactivate the other portion. In an embodiment, the communication module 152 may activate a plurality of antenna elements 221 and 223 spaced a second distance 31b apart among the antenna elements 221, 222, 223, and 224.

For example, as illustrated in FIG. 3B, the communication module 152 may activate the first antenna element 221 and the third antenna element 223 and may deactivate the second antenna element 222 and the fourth antenna element 224. For another example, unlike the illustration of FIG. 3B, the communication module 152 may activate the second antenna element 222 and the fourth antenna element 224 and may deactivate the first antenna element 221 and the third antenna element 223.

According to an embodiment, the second distance 31b between the antenna elements 221 and 223 activated by the communication module 152 may be substantially two times the first distance 21 illustrated in FIG. 2B. For example, the second distance 31b may be substantially two times the first distance 31a illustrated in FIG. 3A and may be substantially the same as a wavelength of an RF signal that is incident externally.

The second graph 310b may show a shape of a beam formed when the distance between the activated antenna elements 221 and 223 is the second distance 31b. Referring to the second graph 310b, the beam may include a main lobe 311b formed in the first direction 301 and grating lobes 312b and 313b formed in a second direction 302 and a third direction 303. The beam may have a gain lower than a specified level for directions other than the first direction 310, the second direction 302, and the third direction 303. According to an embodiment, the direction of the main lobe 311b and the directions of the grating lobes 312b and 313b may form a specified angle. The specified angle may be, for example, substantially 90 degrees.

According to an embodiment, the communication module 152 may change the direction of the beam. For example, the communication module 152 may change the direction of the beam by changing phases of signals received by activated antenna elements, for example, the first antenna element 221 and the third antenna element 223. In this case, the direction of the beam may be changed while maintaining the specified angle formed by the main lobe 311b and the grating lobes 312b and 313b.

Figure 3C:
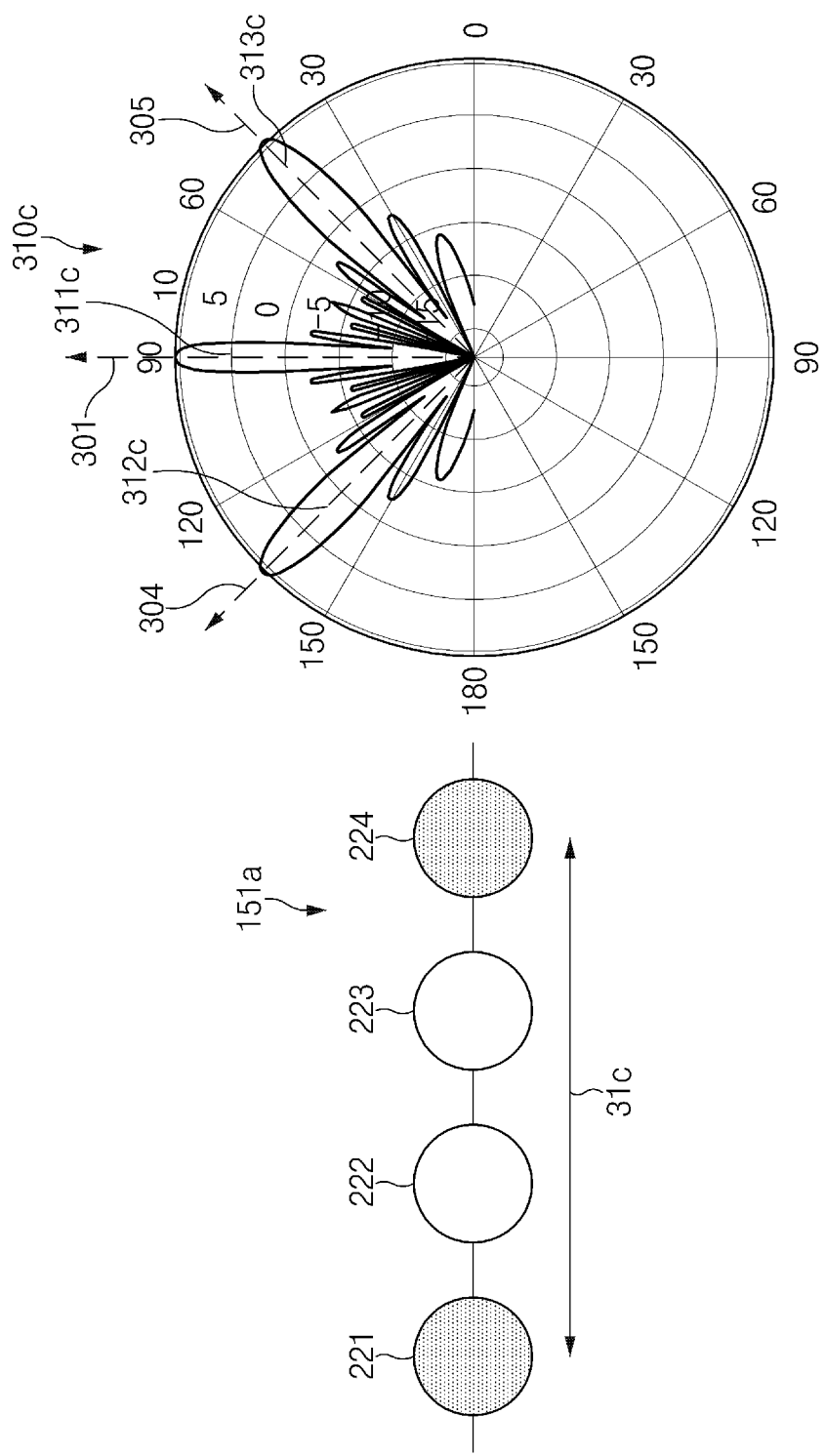
FIG. 3C illustrates a communication device and a shape of a beam generated by the communication device according to another embodiment.

FIG. 3C illustrates a communication device and a shape of a beam generated by the communication device according to another embodiment.

FIG. C illustrates the communication device 151a according to an embodiment and a third graph 310c showing a shape of a beam formed by the communication device 151a. According to an embodiment, the communication module 152 may activate at least a portion of the antenna elements 221, 222, 223, and 224 included in the communication device 151a and may deactivate the other portion. In an embodiment, the communication module 152 may activate a plurality of antenna elements 221 and 224 spaced a third distance 31c apart among the antenna elements 221, 222, 223, and 224.

For example, as illustrated in FIG. 3C, the communication module 152 may activate the first antenna element 221 and the fourth antenna element 224 and may deactivate the second antenna element 222 and the third antenna element 223.

According to an embodiment, the third distance 31c between the antenna elements 221 and 224 activated by the communication module 152 may be substantially three times the first distance 21 illustrated in FIG. 2B. For example, the third distance 31c may be substantially three times the first distance 31a illustrated in FIG. 3A and may be substantially 1.5 times a wavelength of an RF signal that is incident externally.

The third graph 310c may show a shape of a beam formed when the distance between the activated antenna elements 221 and 224 is the third distance 31c. Referring to the third graph 310c, the beam may include a main lobe 311c formed in the first direction 301 and grating lobes 312c and 313c formed in a fourth direction 304 and a fifth direction 305. The beam may have a gain lower than a specified level for directions other than the first direction 310, the fourth direction 304, and the fifth direction 305. According to an embodiment, the direction of the main lobe 311c and the directions of the grating lobes 312c and 313c may form a specified angle. The specified angle may be, for example, substantially 45 degrees.

According to an embodiment, the communication module 152 may change the direction of the beam. For example, the communication module 152 may change the direction of the beam by changing phases of signals received by activated antenna elements, for example, the first antenna element 221 and the fourth antenna element 224. In this case, the direction of the beam may be changed while maintaining the specified angle formed by the main lobe 311c and the grating lobes 312c and 313c.

Figure 4:
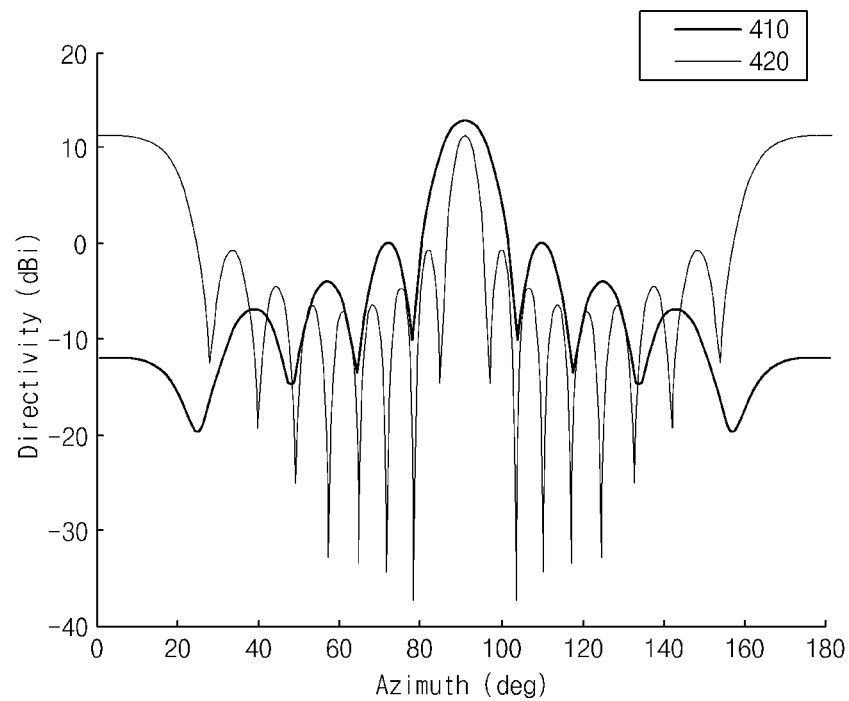
FIG. 4 illustrates shapes of beams formed by a communication device according to various embodiments.

FIG. 4 illustrates shapes of beams formed by a communication device according to various embodiments.

FIG. 4 illustrates a first graph 410 and a second graph 420. The first graph 410 may re-illustrate the first graph 310a illustrated in FIG. 3A in an X-Y coordinate system. The second graph 420 may re-illustrate the second graph 310b illustrated in FIG. 3B in the X-Y coordinate system.

Referring to the first graph 410, the electronic device 100 may form a beam so that a gain of the beam reaches at least a specified level only in one direction. For example, as illustrated in the FIG. 3A, the electronic device 100 may feed a plurality of antenna elements spaced the first distance 31a apart, for example, the second antenna element 222 and the third antenna element 223, and may form a beam.

Referring to the second graph 420, the electronic device 100 may form a beam so that a gain of the beam reaches at least a specified level in a plurality of directions. For example, as illustrated in the FIG. 3B, the electronic device 100 may feed a plurality of antenna elements spaced the second distance 31b apart, for example, the first antenna element 221 and the third antenna element 223, and may form a beam.

Comparing the first graph 410 and the second graph 420, the first graph 410 may show a higher gain at approximately 90 degrees compared to the second graph 420. The second graph 420 may show a gain of at least a specified level in more directions compared to the first graph 410. For example, the first graph 410 may show a gain of at least a specified level, for example, 10 dBi, only at approximately 90 degrees, but the second graph 420 may show gains of at least the specified level at approximately 0 degrees, approximately 90 degrees, and approximately 180 degrees.

Figure 5A:
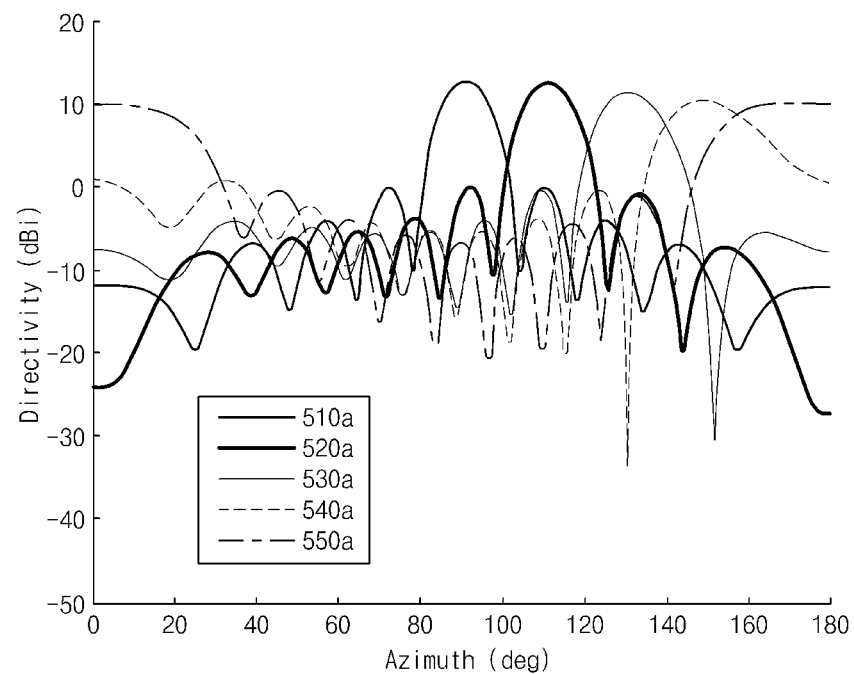
FIG. 5A illustrates a shape of a beam formed by an electronic device using a plurality of antenna elements spaced a first distance apart according to various embodiments.
Figure 5B:
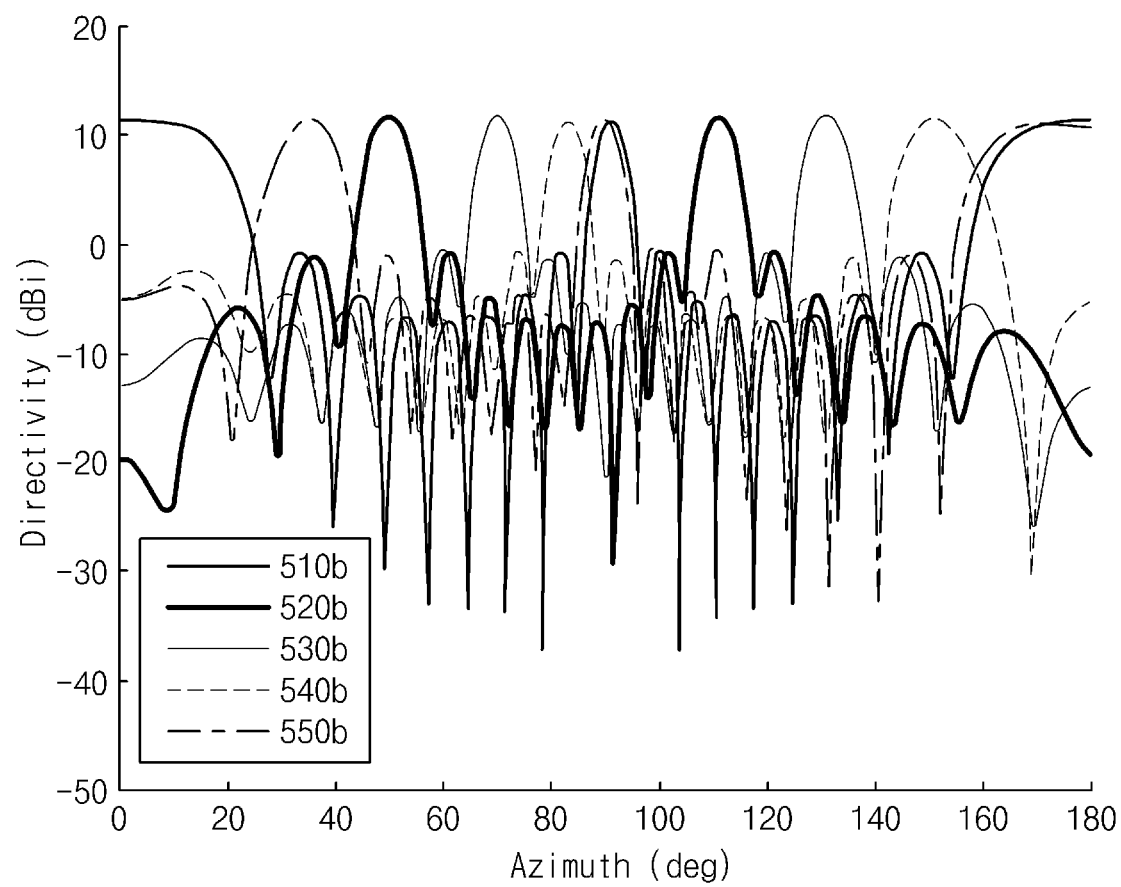
FIG. 5B illustrates a shape of a beam formed by an electronic device using a plurality of antenna elements spaced a second distance apart according to various embodiments.

FIG. 5A illustrates a shape of a beam formed by an electronic device using a plurality of antenna elements spaced a first distance apart according to various embodiments. FIG. 5B illustrates a shape of a beam formed by an electronic device using a plurality of antenna elements spaced a second distance apart according to various embodiments.

FIG. 5A illustrates first to fifth graphs 510a to 550a. The first to fifth graphs 510a to 550a illustrate a shape of a beam formed by the electronic device 100 in which a plurality of antenna elements spaced the first distance 31a of FIG. 3A apart, for example, the second antenna element 222 and the third antenna element 223, are activated.

According to various embodiments, the electronic device 100 may change the direction of the beam formed using the plurality of antenna elements spaced the first distance 31a apart. For example, the electronic device 100 may adjust a phase of a signal received by the second antenna element 222 and a phase of a signal received by the third antenna element 223. The direction of the beam may be changed based on a phase difference between signals received by the plurality of antenna elements.

FIG. 5B illustrates first to fifth graphs 510b to 550b. The first to fifth graphs 510b to 550b illustrate a shape of a beam formed by the electronic device 100 in which a plurality of antenna elements spaced the second distance 31b of FIG. 3B apart, for example, the first antenna element 221 and the third antenna element 223, are activated.

According to various embodiments, the electronic device 100 may change the direction of the beam formed using the plurality of antenna elements spaced the second distance 31b apart. For example, the electronic device 100 may adjust a phase of a signal received by the first antenna element 221 and a phase of a signal received by the third antenna element 223. The direction of the beam may be changed based on a phase difference between signals received by the plurality of antenna elements.

In FIG. 5A or 5B, the second graph 520a or 520b to the fifth graph 550a or 550b may show the cases in which the direction of the beam is changed by a specified angle compared to the first graph 510a or 510b. For example, the second graph 520a or 520b may show the case in which the direction of the beam is changed by approximately 20 degrees compared to the first graph 510a or 510b, and the third graph 530a or 530b may show the case in which the direction of the beam is changed by approximately 40 degrees compared to the first graph 510a or 510b. For another example, the fourth graph 540a or 540b may show the case in which the direction of the beam is changed by approximately 60 degrees compared to the first graph 510a or 510b, and the fifth graph 550a or 550b may show the case in which the direction of the beam is changed by approximately 80 degrees compared to the first graph 510a or 510b.

According to an embodiment, the electronic device 100 may track a direction of an RF signal while changing the direction of the beam by a specified angle each time as described above. According to various embodiments, the specified angle may be set to various values. If the specified angle is relatively large, the electronic device 100 may change the direction of the beam at a relatively higher speed. If the specified angle is relatively small, the electronic device 100 may track the direction of the RF signal relatively more precisely.

According to various embodiments, if a beam is formed using the plurality of antenna elements spaced the second distance 31b apart, the electronic device 100 may have a gain of at least a specified level in a plurality of directions. In this case, the electronic device 100 may track the direction of the RF signal in a wider region at one time compared to the case of forming a beam by using the plurality of antenna elements spaced the first distance 31a apart. Therefore, if the electronic device 100 tracks the direction of the RF signal using the plurality of antenna elements spaced the second distance 31b apart, the direction of the RF signal may be more efficiently sensed compared to the case of using the plurality of antenna elements spaced the first distance 31a apart.

Figure 6A:
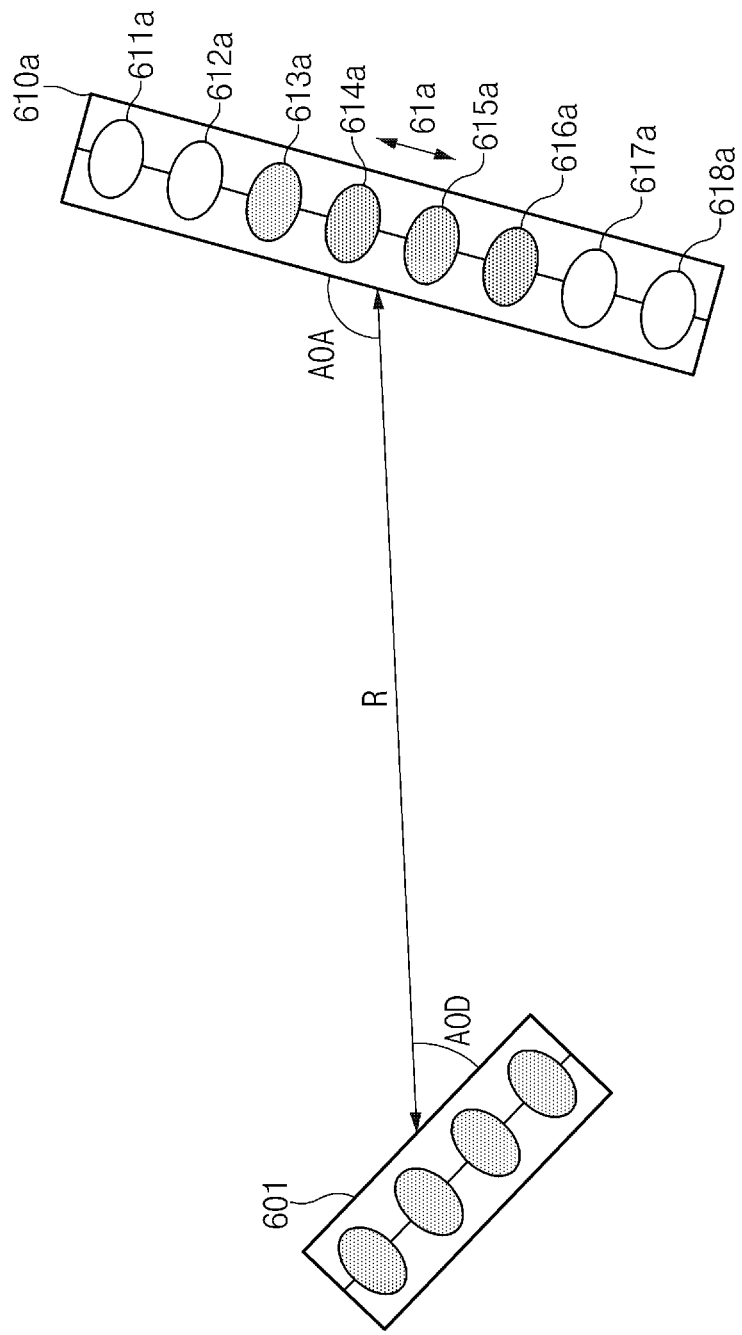
FIG. 6A illustrates a situation in which an electronic device receives a signal transmitted from an external electronic device according to an embodiment.
Figure 6B:
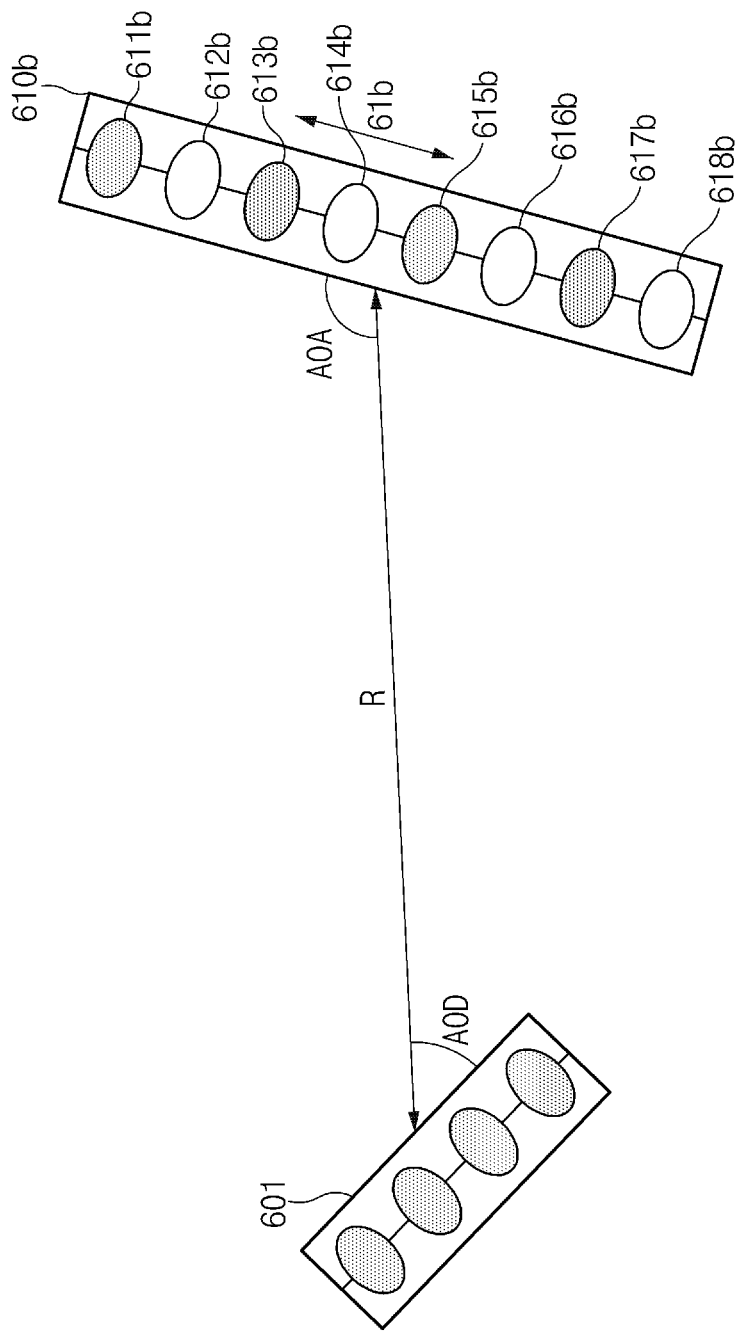
FIG. 6B illustrates a situation in which an electronic device receives a signal transmitted from an external electronic device according to another embodiment.
Figure 6C:
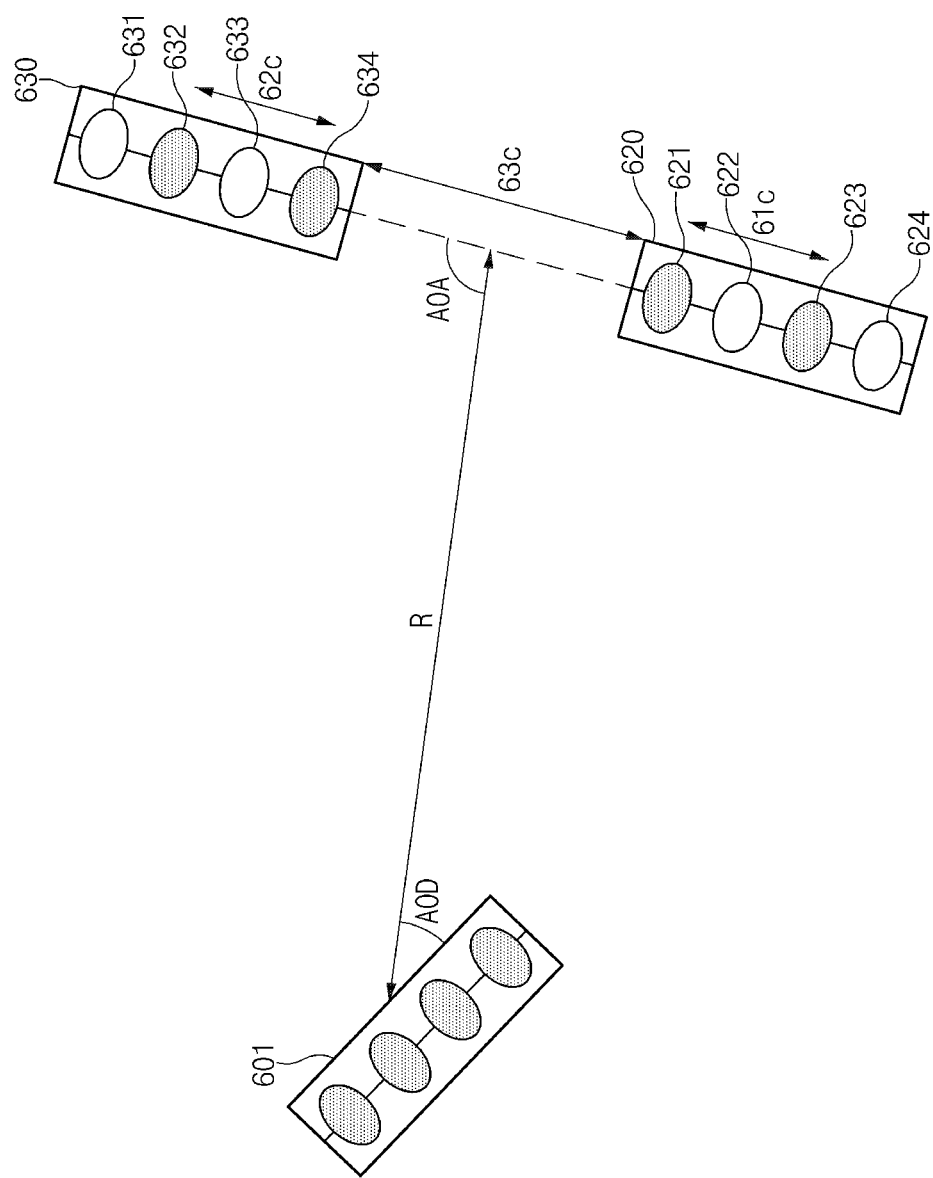
FIG. 6C illustrates a situation in which an electronic device receives a signal transmitted from an external electronic device according to another embodiment.

FIG. 6A illustrates a situation in which an electronic device receives a signal transmitted from an external electronic device according to an embodiment. FIG. 6B illustrates a situation in which an electronic device receives a signal transmitted from an external electronic device according to another embodiment. FIG. 6C illustrates a situation in which an electronic device receives a signal transmitted from an external electronic device according to another embodiment.

Referring to FIGS. 6A to 6C, an electronic device (e.g., the electronic device 100 of FIG. 1A) may sense an RF signal transmitted from a communication device 601 of an external electronic device. According to various embodiments, the communication device 601 of the external electronic device may be spaced a distance R apart from communication devices 610a, 610b, 620, and 630 (e.g., the first communication device 151a of FIG. 1B) of the electronic device.

In FIG. 6A, the communication device 610a may include eight antenna elements 611a, 612a, 613a, 614a, 615a, 616a, 617a, and 618a spaced a specified distance (e.g., the first distance 21 of FIG. 2B) apart. According to an embodiment, the electronic device may activate four antenna elements 613a, 614a, 615a, and 616a arranged at a center among the eight antenna elements 611a, 612a, 613a, 614a, 615a, 616a, 617a, and 618a and may sense the RF signal transmitted from the external electronic device. A distance between the activated antenna elements 613a, 614a, 615a, and 616a may be a first distance 61a, for example, the first distance 31a illustrated in FIG. 3A. For example, the first distance 61a may substantially the same as the first distance 21 illustrated in FIG. 2B and may substantially the same as half of the wavelength of the RF signal.

According to an embodiment, the activated antenna elements 613a, 614a, 615a, and 616a may form a first beam including a main lobe. The first beam, for example, may have a shape that is the same as or similar to that of the beam illustrated in FIG. 3A. The electronic device may sense the RF signal by changing the direction of the first beam by a specified angle each time.

In FIG. 6B, the communication device 610b may include eight antenna elements 611b, 612b, 613b, 614b, 615b, 616b, 617b, and 618b spaced a specified distance (e.g., the first distance 21 of FIG. 2B) apart. According to an embodiment, the electronic device may activate four antenna elements 611b, 613b, 615b, and 617b spaced a second distance 61b (e.g., the second distance 31b of FIG. 3B) apart from each other among the eight antenna elements 611b, 612b, 613b, 614b, 615b, 616b, 617b, and 618b, and may sense the RF signal transmitted from the external electronic device. The second distance 61b, which is a distance between the activated antenna elements 611b, 613b, 615b, and 617b, may be two times the first distance 21 illustrated in FIG. 2B. For example, the second distance 61b may be substantially the same as the wavelength of the RF signal.

According to an embodiment, the activated antenna elements 611b, 613b, 615b, and 617b may form a second beam including a main lobe and a grating lobe. The second beam, for example, may have a shape that is the same as or similar to that of the beam illustrated in FIG. 3B. The electronic device 100 may sense the RF signal by changing the direction of the second beam by a specified angle each time.

In FIG. 6C, the electronic device may sense an RF signal using a first communication device 620 (e.g., the first communication device 151a of FIG. 1B) and a second communication device 630 (e.g., the second communication device 151b of FIG. 1B). According to an embodiment, the first communication device 620 and the second communication device 630 may be arranged spaced a specified distance 63c apart. The specified distance 63c, for example, may be substantially five times the wavelength of the RF signal. In an embodiment, the first communication device 620 may include four antenna elements 621, 622, 623, and 624 spaced a specified distance (e.g., the first distance 21 of FIG. 2B) apart, and the second communication device 630 may include four antenna elements 631, 632, 633, and 634 spaced the specified distance apart.

According to an embodiment, for each of the communication devices 620 and 630, the electronic device may activate two antenna elements spaced a second distance 61c, 62c (e.g., the second distance 31b of FIG. 3B) apart from each other among the four antenna elements. For example, the electronic device may activate the antenna elements 621 and 623 for the first communication device 620, and may activate the antenna elements 632 and 634 for the second communication device 630. The electronic device may sense the RF signal transmitted from the external electronic device using the activated antenna elements 621, 623, 632, and 634. The second distance 61c or 62c, which is a distance between the activated antenna elements 621, 623, 632, and 634, may be two times the first distance 21 illustrated in FIG. 2B. For example, the distance may be substantially the same as the wavelength of the RF signal.

According to an embodiment, the activated antenna elements 621 and 623 of the first communication device 620 and the activated antenna elements 632 and 634 of the second communication device 630 each may form a third beam including a main lobe and a grating lobe. The third beam, for example, may have a shape that is the same as or similar to that of the beam illustrated in FIG. 3B. The electronic device may sense the RF signal by changing the direction of the third beam by a specified angle each time.

Referring to table 1 shown below, a result of simulation of a situation in which the electronic device including each of the communication devices 610a, 610b, 620, and 630 illustrated in FIGS. 6A to 6C attempts to receive the RF signal transmitted from the external electronic device may be confirmed.

According to an embodiment, the electronic device including the communication device 610a illustrated in FIG. 6A may sense the RF signal when the direction of the beam has been changed 76.96 times on average, and a probability of failing to sense the RF signal is 29.5%. According to another embodiment, the electronic device including the communication device 610b illustrated in FIG. 6B may sense the RF signal when the direction of the beam has been changed 62.78 times on average, and a probability of failing to sense the RF signal is 15.9%. Through this result, it may be confirmed that sensing the RF signal by using a beam including both a main lobe and a grating lobe is more efficient.

According to an embodiment, the electronic device including the communication device 610b illustrated in FIG. 6B may sense the RF signal when the direction of the beam has been changed 62.78 times on average, and a probability of failing to sense the RF signal is 15.9%. According to another embodiment, the electronic device including the communication devices 620 and 630 illustrated in FIG. 6C may sense the RF signal when the direction of the beam has been changed 64.99 times on average, and a probability of failing to sense the RF signal is 17.5%.

Through this result, it may be confirmed that a capability of sensing the RF signal slightly decreases when sensing the RF signal by using a plurality of communication devices compared to when sensing the RF signal by activating more antenna elements in a single communication device. However, in general, when the number of antenna elements is increased by two times, a maximum gain of a beam formed by the antenna elements may increase by about 3 dB theoretically. Therefore, using a plurality of communication devices may increase the maximum gain of a beam, and thus may be more advantageous for sensing an RF signal transmitted from a longer distance. Furthermore, it may be confirmed that it is still more efficient to sense an RF signal using a plurality of communication devices than to sense an RF signal using a beam including only a main lobe.

TABLE 1

| Distance between activated antenna elements | Number of times on average | Probability of sensing failure | Signal to noise ratio |
| --- | --- | --- | --- |
| First distance | 76.96 | 29.5% | 28.63 dB |
| Second distance | 62.78 | 15.9% | 32.45 dB |
| Second distance (Using a plurality of communication devices) | 64.99 | 17.5% | 31.9 dB |

Figure 7:
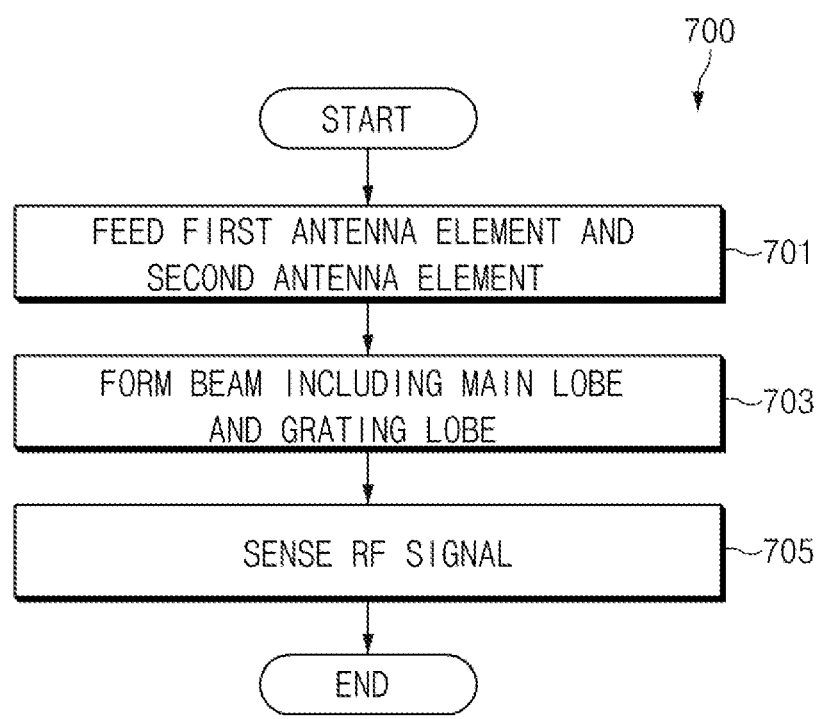
FIG. 7 is a flowchart illustrating a method for an electronic device to sense an RF signal according to an embodiment.

FIG. 7 is a flowchart illustrating a method for an electronic device to sense an RF signal according to an embodiment.

Referring to FIG. 7, a method 700 for an electronic device (e.g., the electronic device 100 of FIG. 1A) to sense an RF signal may include operations 701 to 705. According to an embodiment, operations 701 to 705 may be performed by the electronic device (or a communication module (e.g., the communication module 152 of FIG. 1B)).

In operation 701, in order to activate a first antenna element (e.g., the first antenna element 221 of FIG. 3B) and a second antenna element (e.g., the third antenna element 223 of FIG. 3B) spaced a second distance (e.g., the second distance 31b of FIG. 3B) apart from the first antenna element, the electronic device may feed the first antenna element and the second antenna element.

In an embodiment, the second distance may be the same as the second distance 31b illustrated in FIG. 3B. For example, the second distance may be two times the first distance 21 illustrated in FIG. 2B and may substantially the same as of the wavelength of a received RF signal.

In an embodiment, the second distance may be the same as the third distance 31c illustrated in FIG. 3C. For example, the second distance may be three times the first distance 21 illustrated in FIG. 2B and may be substantially 1.5 times the wavelength of a received RF signal.

In operation 703, the electronic device may form a beam including a main lobe and a grating lobe that forms a specified angle with the main lobe using the first antenna element and the second antenna element. For example, in the case where the second distance is the same as the second distance 31b of FIG. 3B in operation 701, the specified angle may be substantially the same as 90 degrees. For another example, in the case where the second distance is the same as the third distance 31c of FIG. 3C in operation 701, the specified angle may be substantially the same as 45 degrees.

According to an embodiment, the grating lobe may be at least one. For example, the grating lobe may include two lobes with the main lobe therebetween, the two lobes forming the specified angle with the main lobe.

According to various embodiments, an intensity of the grating lobe may be at least a specified level. For example, the intensity of the grating lobe may be lower than the intensity of the main lobe by a specified level or lower.

In operation 705, the electronic device may sense an RF signal using the beam formed in operation 703. For example, the electronic device may change the directions of the main lobe and the grating lobe by a specified angle each time and may track the RF signal. According to various embodiments, while the direction of the beam is changed, the angle between the main lobe and the grating lobe may be maintained as the specified angle. In an embodiment, if at least a part of the main lobe or the grating lobes is aligned with the direction of the RF signal, the electronic device may sense the RF signal.

Through operations 701 to 705, the electronic device may track the RF signal by simultaneously using a plurality of beams having an intensity of at least a specified level, for example, the main lobe and the grating lobe. In this manner, the electronic device may sense the RF signal more efficiently.

Figure 8A:
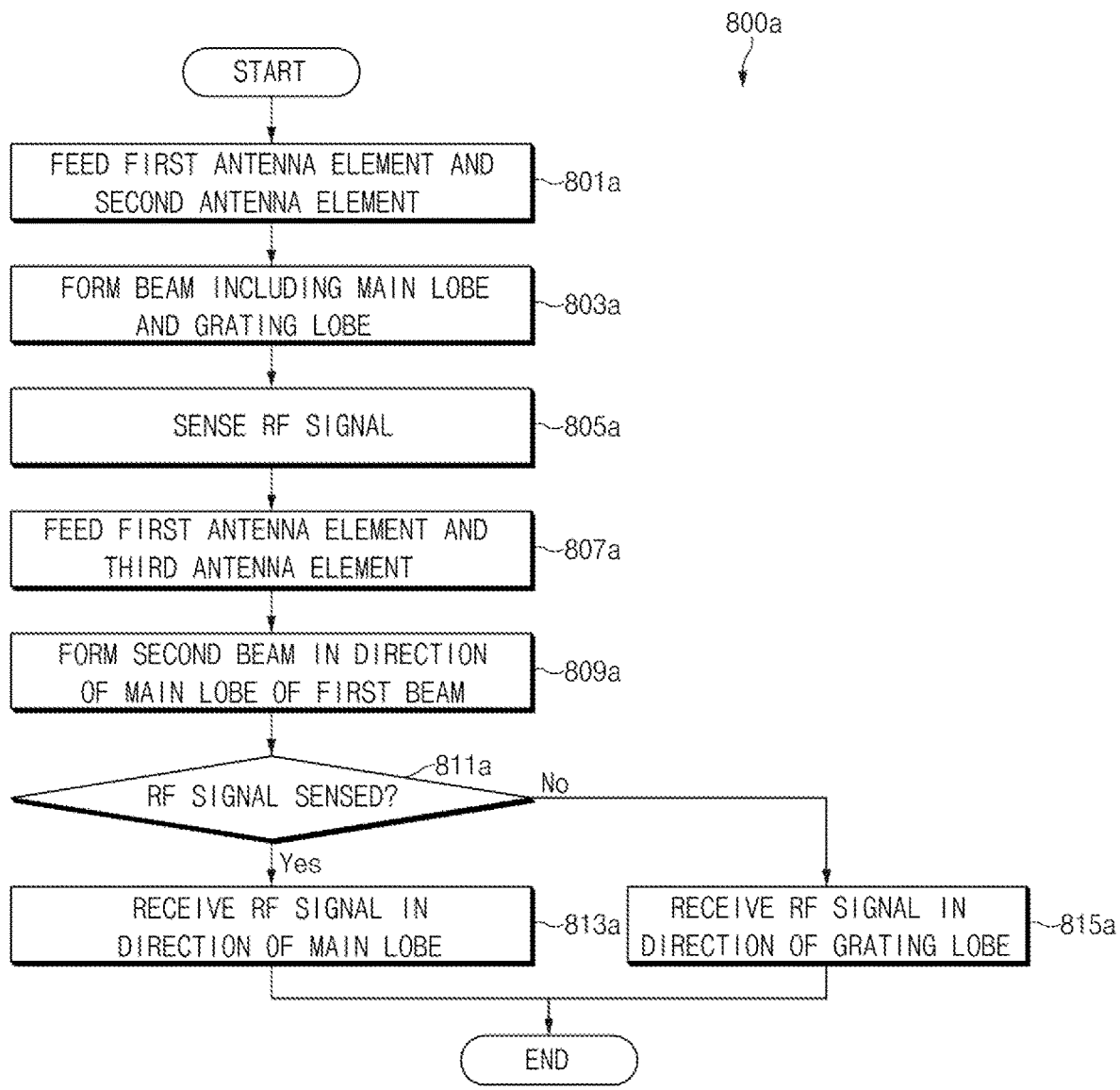
FIG. 8A is a flowchart illustrating a method for an electronic device to receive an RF signal according to an embodiment.

FIG. 8A is a flowchart illustrating a method for an electronic device to receive an RF signal according to an embodiment.

Referring to FIG. 8A, a method 800a for an electronic device (e.g., the electronic device 100 of FIG. 1A) to receive an RF signal may include operations 801a to 815a. According to an embodiment, operations 801a to 815a may be performed by the electronic device (or a communication module (e.g., the communication module 152 of FIG. 1B)). Descriptions that overlap with the descriptions provided above with reference to FIG. 7 may be omitted when describing FIG. 8A. For example, operations 801a to 805a may be the same as or similar to operations 701 to 705 of FIG. 7 respectively.

In operation 801a, the electronic device may feed a first antenna element (e.g., the first antenna element 221 of FIG. 3B) and a second antenna element (e.g., the third antenna element 223 of FIG. 3B) spaced a second distance (e.g., the second distance 31b of FIG. 3B) apart from the first antenna element.

In operation 803a, the electronic device may form a beam including a main lobe and a grating lobe that forms a specified angle with the main lobe, for example, a first beam, using the first antenna element and the second antenna element. In an embodiment, the first beam may be referred to as a first reception beam.

In operation 805a, the electronic device may sense an RF signal from at least one of the main lobe or the grating lobe. In an embodiment, the electronic device may perform beam sweeping using the first reception beam. For example, the electronic device may change the directions of the main lobe and the grating lobe by a specified angle each time and may track the RF signal. It may be necessary for the electronic device to distinguish whether the RF signal has been sensed through the main lobe or the grating lobe in order to accurately sense the direction of the sensed RF signal.

In an embodiment, the electronic device may be configured to sense a synchronization signal (or a beam sequence) while sweeping the first beam, and report an ID of a transmission beam if the synchronization signal is sensed.

In operation 807a, in order to activate the first antenna element and a third antenna element spaced a first distance (e.g., the first distance 31a of FIG. 3A) apart from the first antenna element, the electronic device may feed the first antenna element and the third antenna element. For example, the first distance may be the same as the first distance 21 illustrated in FIG. 2B. For example, the first distance may be substantially the same as half of the wavelength of the RF signal.

In operation 809a, the electronic device may form a second beam differentiated from the first beam using the first antenna element and the third antenna element. In an embodiment, the electronic device may form the second beam in a direction of the main lobe of the first beam. In an embodiment, the electronic device may perform beam sweeping using the second beam. In an embodiment, the second beam may be referred to as a second reception beam. In an embodiment, the electronic device may be configured to sense a transmit/receive point (TRP) beam while sweeping the second beam.

According to an embodiment, unlike the first beam, the second beam may not include a grating lobe having an intensity of at least a specified level. For example, unlike the first beam, the second beam may track the RF signal only in one direction, for example, in the direction of the main lobe.

In operation 811a, the electronic device may determine whether the RF signal is sensed using the second beam. The electronic device may perform operation 813a if the RF signal is sensed, and may perform operation 815a if the RF signal is not sensed.

In operation 813a, if the electronic device senses the RF signal through the second beam, the electronic device may determine that the direction of the RF signal is substantially the same as the direction of the main lobe of the second beam. Therefore, the electronic device may activate a portion or all of antenna elements included in an antenna array in the direction, and may receive the RF signal that is incident on the electronic device.

In operation 815a, if the electronic device fails to sense the RF signal through the second beam, the electronic device may determine that the direction of the RF signal is different from the direction of the main lobe of the second beam. In this case, it may be determined that the RF signal sensed by the electronic device in operation 805a has been sensed through the grating lobe of the first beam. Therefore, the electronic device may activate a portion or all of antenna elements included in an antenna array in the direction of the grating lobe of the first beam, and may receive the RF signal that is incident on the electronic device.

According to an embodiment, the grating lobe may be at least one. In the case where a plurality of the grating lobes are present, the electronic device may activate a portion or all of antenna elements included in an antenna array in the direction of one grating lobe among the grating lobes. If the RF signal is not sensed, the electronic device may activate a portion or all of antenna elements included in an antenna array in the direction of a grating lobe that is different from the one grating lobe.

Through operations 801a to 815a, the electronic device may more efficiently sense an RF signal and may determine the direction of the sensed RF signal. The electronic device may receive the RF signal in the determined direction. For example, the electronic device may be configured to initiate communication at least partially based on the direction of the sensed TRP beam. The electronic device may use only a portion of antenna elements while determining the direction of the RF signal, and may reduce power consumption.

Figure 8B:
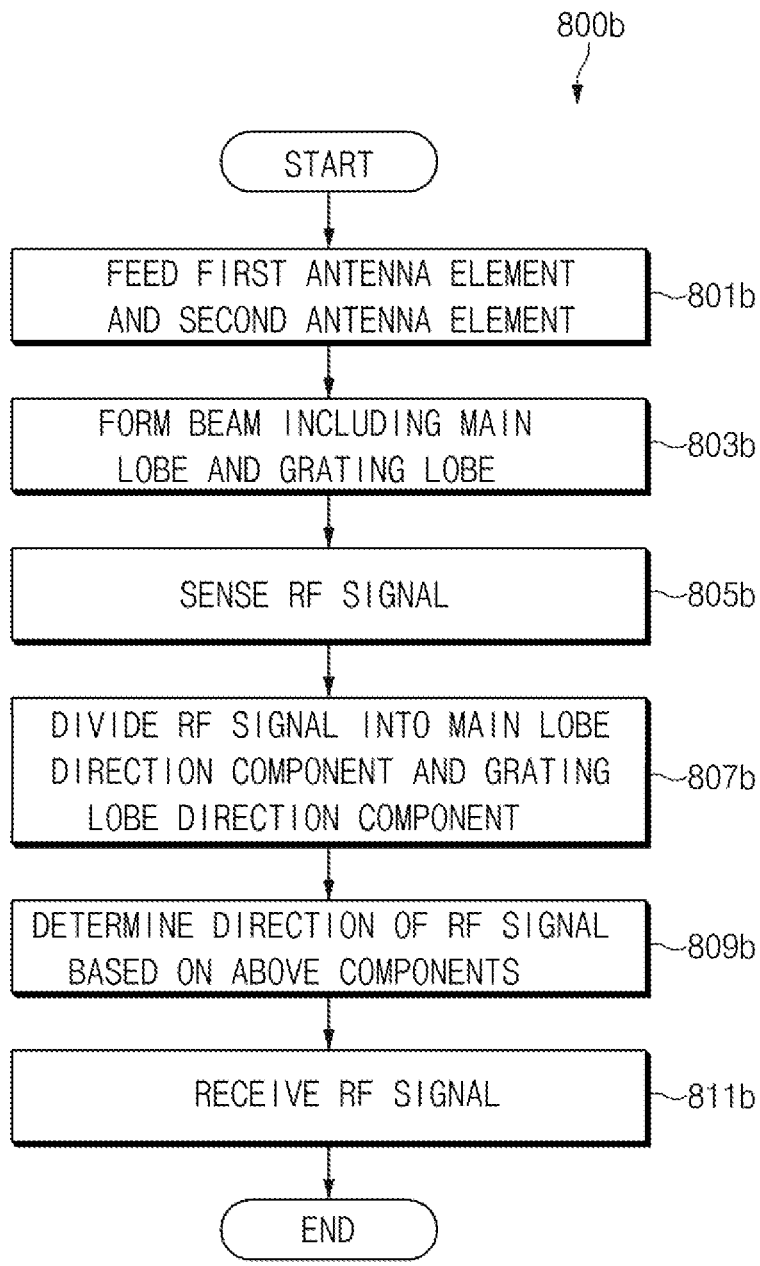
FIG. 8B is a flowchart illustrating a method for an electronic device to receive an RF signal according to another embodiment.

FIG. 8B is a flowchart illustrating a method for an electronic device to receive an RF signal according to another embodiment.

Referring to FIG. 8B, a method 800b for an electronic device (e.g., the electronic device 100 of FIG. 1A) to receive an RF signal may include operations 801b to 811b. According to an embodiment, operations 801a to 811b may be performed by the electronic device (or a communication module (e.g., the communication module 152 of FIG. 1B)). Descriptions that overlap with the descriptions provided above with reference to FIG. 7 may be omitted when describing FIG. 8B. For example, operations 801b and to 805b may be the same as or similar to operations 701 to 705 of FIG. 7 respectively.

In operation 801b, the electronic device may feed a first antenna element (e.g., the first antenna element 221 of FIG. 3B) and a second antenna element (e.g., the third antenna element 223 of FIG. 3B) spaced a second distance (e.g., the second distance 31b of FIG. 3B) apart from the first antenna element.

In operation 803b, the electronic device may form a beam including a main lobe and a grating lobe that forms a specified angle with the main lobe using the first antenna element and the second antenna element.

In operation 805b, the electronic device may sense an RF signal from at least one of the main lobe or the grating lobe. For example, the electronic device may change the directions of the main lobe and the grating lobe by a specified angle each time and may track the RF signal. It may be necessary for the electronic device to distinguish whether the RF signal has been sensed through the main lobe or the grating lobe in order to sense the direction of the sensed RF signal.

In operation 807b, the electronic device may receive the RF signal sensed in operation 805b, and may divide the received RF signal into a main lobe direction component and a grating lobe direction component. For example, the electronic device may calculate an inner product of direction vectors of the main lobe and the received RF signal in order to obtain the main lobe direction component of the RF signal. For another example, the electronic device may calculate an inner product of direction vectors of the grating lobe and the received RF signal in order to obtain the grating lobe direction component of the RF signal.

In operation 809b, the electronic device may determine the direction of the RF signal based on the direction components divided in operation 805b. For example, if an intensity of the main lobe direction component of the RF signal is higher than an intensity of the grating lobe direction component, the electronic device may determine the direction of the RF signal as the direction of the main lobe. For another example, if the intensity of the main lobe direction component of the RF signal is lower than the intensity of the grating lobe direction component, the electronic device may determine the direction of the RF signal as the direction of the grating lobe.

In operation 811b, the electronic device may activate a portion or all of antenna elements included in an antenna array in the direction determined in operation 809b, and may receive the RF signal that is incident on the electronic device.

Through operations 801b to 811b, the electronic device may more efficiently sense an RF signal and may determine the direction of the sensed RF signal. The electronic device may receive the RF signal in the determined direction. The electronic device may use only a portion of antenna elements while determining the direction of the RF signal, and may reduce power consumption.

Figure 9:
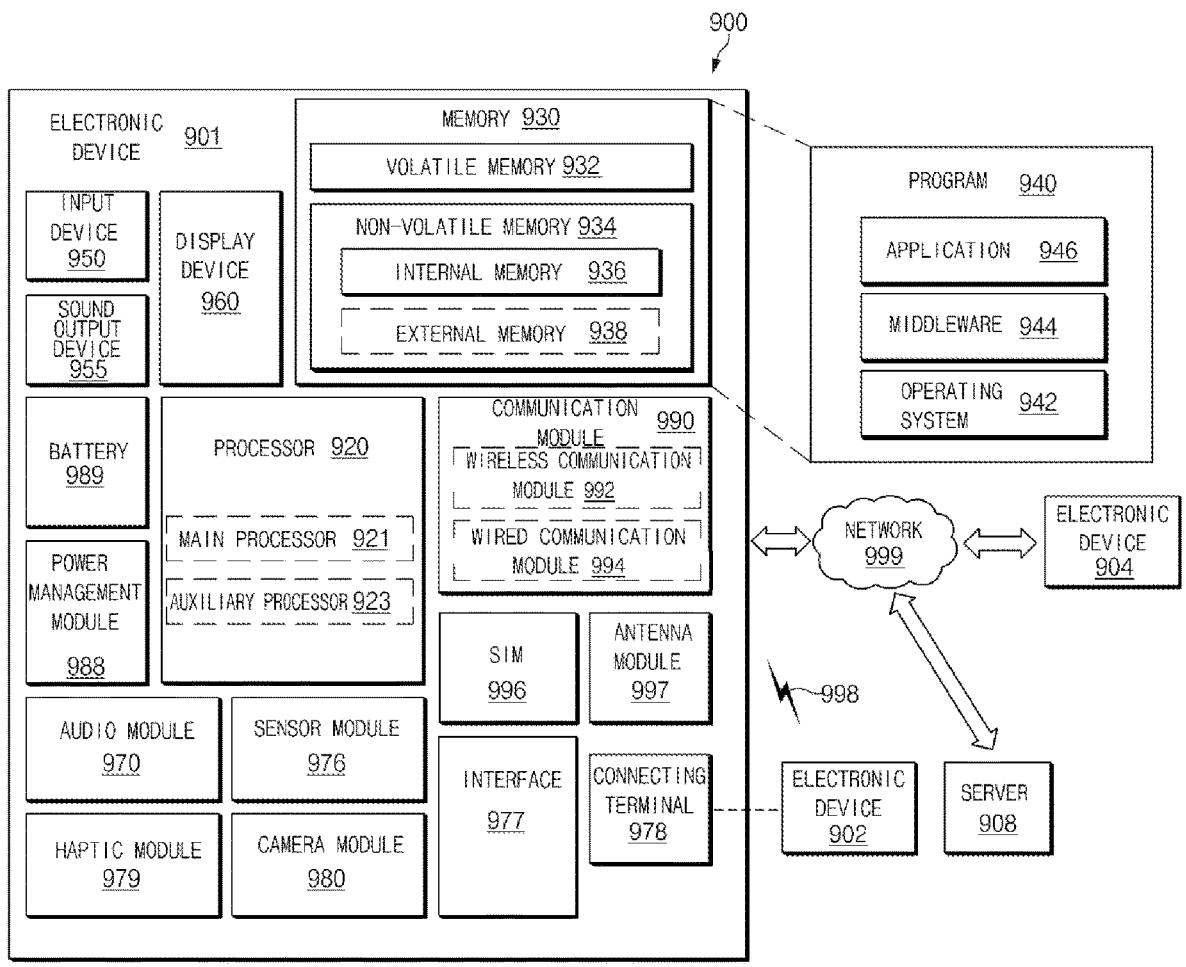
FIG. 9 is a block diagram illustrating an electronic device in a network environment according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
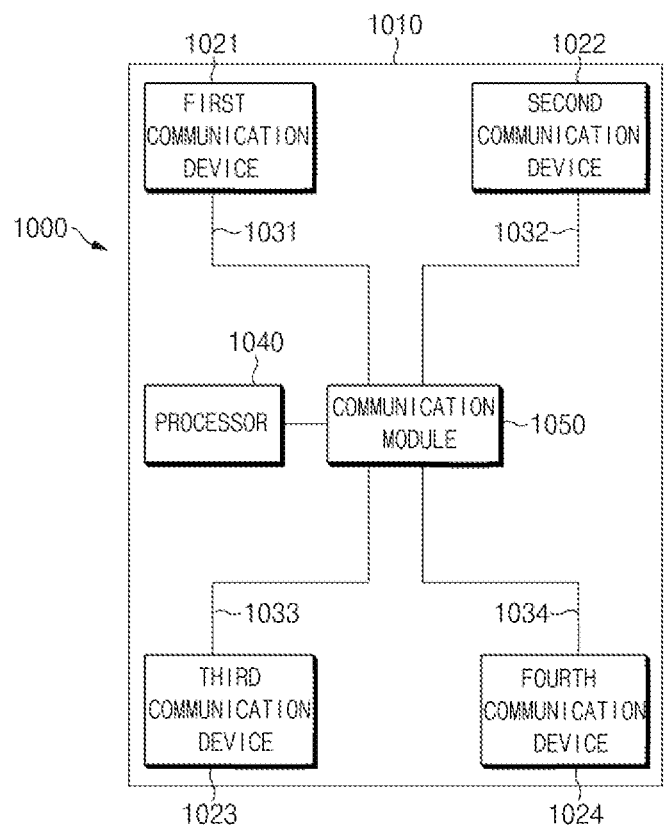
FIG. 10 is a diagram illustrating an example of an electronic device supporting 5G communication.

FIG. 10 is a diagram illustrating an example of an electronic device supporting 5G communication.

Referring to FIG. 10, an electronic device 1000 may include a housing 1010, a processor 1040, a communication module 1050 (e.g., the communication module 152 of FIG. 1B, the communication module 990 of FIG. 9), a first communication device 1021, a second communication device 1022, a third communication device 1023, a fourth communication device 1024, a first conductive line 1031, a second conductive line 1032, a third conductive line 1033, or a fourth conductive line 1034.

According to an embodiment, the housing 1010 may protect other components of the electronic device 1000. The housing may include, for example, a front plate, a back plate facing away from the front plate, and a side member (or metal frame) attached to the back plate or integrated with the back plate and surrounding a space between the front plate and the back plate.

According to an embodiment, the electronic device 1000 may include at least one of the first communication device 1021, the second communication device 1022, the third communication device 1023, or the fourth communication device 1024.

According to an embodiment, the first communication device 1021, the second communication device 1022, the third communication device 1023, or the fourth communication device 1024 may be positioned inside the housing 1010. According to an embodiment, when viewed from above the back plate, the first communication device 1021 may be arranged on a top left side of the electronic device 1000, the second communication device 1022 may be arranged on a top right side of the electronic device 1000, the third communication device 1023 may be arranged on a bottom left side of the electronic device 1000, and the fourth communication device 1000 may be arranged on a bottom right side of the electronic device 1000.

According to an embodiment, the processor 1040 may include at least one of a central processing unit, an application processor, a graphic processing unit (GPU), an image signal processor of a camera, or a baseband processor (or a communication processor (CP)). According to an embodiment, the processor 1040 may be implemented as a system on chip (SoC) or system in package (SiP).

According to an embodiment, the communication module 1050 may be electrically connected to the first communication device 1021, the second communication device 1022, the third communication device 1023, or the fourth communication device 1024 using the first conductive line 1031, the second conductive line 1032, the third conductive line 1033, and/or the fourth conductive line 1034. The communication module 1050 may include, for example, a baseband processor or at least one communication circuit (e.g., IFIC or RFIC). The communication module 1050 may include, for example, a baseband processor separate from the processor 1040 (e.g., an application processor (AP)). The first conductive line 1031, the second conductive line 1032, the third conductive line 1033, and/or the fourth conductive line 1034 may include, for example, a coaxial cable or an FPCB.

According to an embodiment, the communication module 1050 may include a first baseband processor (BP) (not shown) and/or a second baseband processor (BP) (not shown). The electronic device 1000 may further include at least one interface for supporting inter-chip communication between the first BP (or second BP) and the processor 1040. The processor 1040 and the first BP and/or second BP may transmit/receive data using the inter-chip interface (inter processor communication channel).

According to an embodiment, the first BP and/or the second BP may provide an interface for communicating with other entities. The first BP, for example, may support wireless communication for a first network (not shown). The second BP, for example, may support wireless communication for a second network (not shown).

According to an embodiment, the first BP and/or the second BP may form one module with the processor 1040. For example, the first BP and/or the second BP may be integrally formed with the processor 1040. For another example, the first BP and/or the second BP may be arranged in one chip, or may be formed as an individual chip. According to an embodiment, the processor 1040 and at least one baseband processor (e.g., the first BP) may be integrally formed in one chip (SoC chip), and another baseband processor (e.g., the second BP) may be formed as an individual chip.

According to an embodiment, the first network (not shown) and/or the second network (not shown) may correspond to the network 999 of FIG. 9. According to an embodiment, each of the first network (not shown) and the second network (not shown) may include a 4th generation (4G) network and a 5th generation (5G) network. The 4G network may include, for example, a long term evolution (LTE) protocol defined in 3GPP. The 5G network may include, for example, a new radio (NR) protocol defined in 3GPP.

Figure 11:
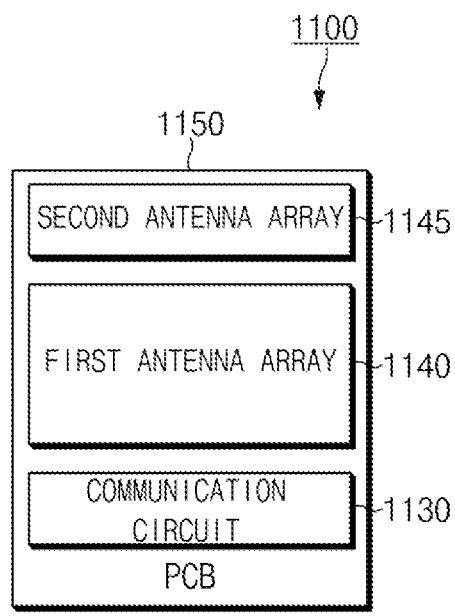
FIG. 11 is a block diagram illustrating a communication device according to an embodiment.

FIG. 11 is a block diagram illustrating a communication device according to an embodiment.

Referring to FIG. 11, a communication device 1100 (e.g., the first communication device 1021, the second communication device 1022, the third communication device 1023, and/or the fourth communication device 1024 of FIG. 10) may include a communication circuit 1130 (e.g., RFIC), a PCB 1150, a first antenna array 1140, and/or a second antenna array 1145.

According to an embodiment, the communication circuit 1130, the first antenna array 1140, and the second antenna array 1145 may be positioned on the PCB 1150. For example, the first antenna array 1140 and/or the second antenna array 1145 may be arranged on a first surface of the PCB 1150, and the communication circuit 1130 may be positioned on a second surface of the PCB 1150. The PCB 1150 may include a connector (e.g., a coaxial cable connector and/or a board to board (B-to-B)) for electrically connecting to another PCB (e.g., the PCB on which the communication module 1050 of FIG. 10 is arranged) using a transmission line (e.g., the first conductive line 1031 of FIG. 10, a coaxial cable). The PCB 1150, for example, may be connected to the PCB on which the communication module 1050 is arranged by a coaxial cable using a coaxial cable connector, and the coaxial cable may be used to transfer a transmission and/or reception IF signal or RF signal. For another example, power or other control signals may be transferred through a B-to-B connector.

According to an embodiment, the first antenna array 1140 and/or the second antenna array 1145 may include a plurality of antennas. The antennas may include, for example, a patch antenna, a loop antenna, and/or a dipole antenna. For example, at least a portion of the plurality of antennas included in the first antenna array 1140 may be a patch antenna for forming a beam towards the back plate of the electronic device 1000. For another example, at least a portion of the plurality of antennas included in the second antenna array 1145 may be a dipole antenna and/or a loop antenna for forming a beam towards the side member of the electronic device 1000.

According to an embodiment, the communication circuit 1130 may support at least a partial band (e.g., 24 GHz to 30 GHz or 37 GHz to 40 GHz) of a band ranging from 20 GHz to 100 GHz. According to an embodiment, the communication circuit 1130 may up-convert or down-convert a frequency. For example, the communication circuit 1130 included in the communication device 1100 (e.g., the first communication device 1021 of FIG. 10) may up-convert, into an RF signal, an IF signal received from a communication module (e.g., the communication module 1050 of FIG. 10) via a conductive line (e.g., the first conductive line 1031 of FIG. 10). For another example, the communication circuit 1130 included in the communication device 1100 (e.g., the first communication device 1021 of FIG. 10) may down-convert, into an IF signal, an RF signal (e.g., a millimeter wave signal) received via the first antenna array 1140 and/or the second antenna array 1145, and may transmit the IF signal to the communication module using a conductive line.

Figure 12:
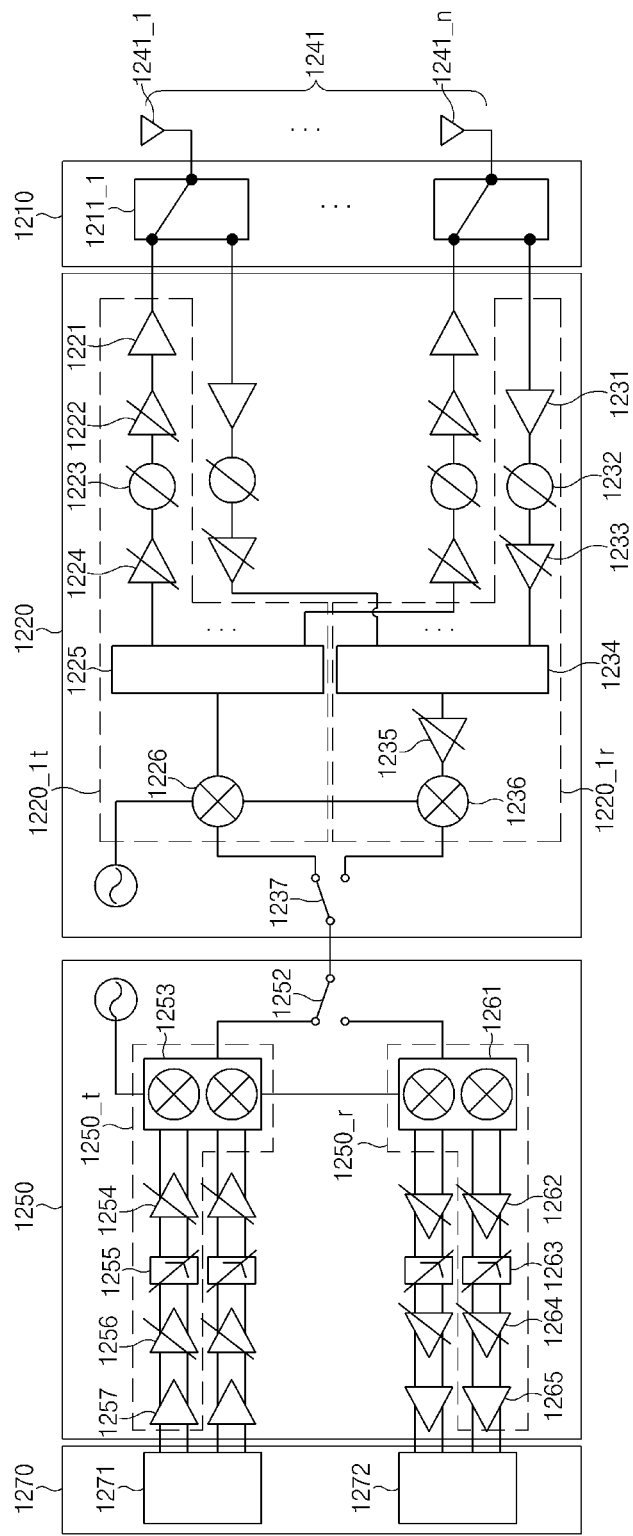
FIG. 12 illustrates a communication system according to an embodiment.

FIG. 12 illustrates a communication system of an electronic device according to an embodiment.

Referring to FIG. 12, a communication system (e.g., the communication system 150 of FIG. 1B) may include a switch group 1210, an RF IC 1220, an IF IC 1250, and a communication processor 1270. In various embodiments, a portion of the components of the communication system may be omitted or may be further added. For example, an additional RFIC may be further added to the components of the communication system.

According to an embodiment, an antenna element (e.g., 1241_1, 1241_n) included in a first antenna array 1241 may be connected to the RF IC 1220 via a switch 1211_1 included in the switch group 1210. For example, the switch 1211_1 may connect an antenna element (e.g., 1241_1) and a power amplifier (PA) (e.g., 1221) when an electronic device (e.g., the electronic device 100 of FIG. 1A) transmits an RF signal (e.g., in the case of a signal transmission mode), and may connect an antenna element (e.g., 1241_1) and a low noise amplifier (LNA) (e.g., 1231) when the electronic device receives an RF signal (e.g., in the case of a signal reception mode).

According to an embodiment, the RF IC 1220 may include a transmission path 1220_1t and a reception path 1220_1r of an RF signal.

According to an embodiment, when the electronic device is in the signal transmission mode, at least one of the PA 1221, a first variable gain amplifier (VGA) 1222, a phase shifter (PS) 1223, a second VGA 1224, a combiner 1225, or a mixer 1226 may be arranged in the transmission path 1220_1t of an RF signal.

The PA 1221 may amplify power of an RF signal to be transmitted. According to an embodiment, the PA 1221 may be mounted inside or outside the RF IC 1220. The first VGA 1222 and the second VGA 1224 may be controlled by the communication processor 1270 to perform a transmission auto gain control (AGC) operation. According to an embodiment, the number of VGAs may be at least two or less than two. The PS 1223 may change a phase of an RF signal according to a beamforming angle based on a control by the communication processor 1270. The combiner 1225 may separate an RF signal received from the mixer 1226 into n number of signals. The number n of separated signals, for example, may be equal to the number of antenna elements (e.g., 1241_1, 1241_n) included in the first antenna array 1241. The mixer 1226 may up-convert an IF signal received from the IF IC 1250 into an RF signal. In an embodiment, the mixer 1226 may receive a signal to be mixed from an internal or external oscillator.

According to an embodiment, when the electronic device is in the signal reception mode, the LNA 1231, a PS 1232, a first VGA 1233, a combiner 1234, a second VGA 1235, and a mixer 1236 may be arranged in the reception path 1220_1r of an RF signal.

The LNA 1231 may amplify an RF signal received from an antenna element (e.g., 1241_1, 1241_n). The first VGA 1233 and the second VGA 1235 may be controlled by the communication processor 1270 to perform a reception AGC operation. According to an embodiment, the number of VGAs may be at least two or less than two. The PS 1232 may change a phase of an RF signal according to a beamforming angle based on a control by the communication processor 1270. The combiner 1234 may combine RF signals having phases that have been changed and aligned to the same phase. The combined signal may be transferred to the mixer 1236 via the second VGA 1235. The mixer 1236 may down-convert a received RF signal into an IF signal. In an embodiment, the mixer 1236 may receive a signal to be mixed from an internal or external oscillator.

According to an embodiment, the RF IC 1220 may further include a switch 1237 for electrically connecting the mixers 1226 and 1236 and the IF IC 1250. The switch 1237 may selectively connect the transmission path 1220_1t or the reception path 1220_1r of an RF signal to the IF IC 1250.

According to an embodiment, a mixer 1253, a third VGA 1254, a low pass filter (LPF) 1255, a fourth VGA 1256, and a buffer 1257 may be arranged in a transmission path 1250_t in the IFIC 1250. The mixer 1253 may convert a balanced in-phase/quadrature-phase (I/Q) signal of a baseband into an IF signal. The LPF 1255 may serve as a channel filter having a bandwidth of a baseband signal as a cutoff frequency. In an embodiment, the cutoff frequency may be variable. The third VGA 1254 and the fourth VGA 1256 may be controlled by the communication processor 1270 to perform a transmission AGC operation. According to an embodiment, the number of VGAs may be at least two or less than two. The buffer 1257 may serve as a buffer when receiving a balanced I/Q signal from the communication processor 1270, thus enabling the IF IC 1250 to stably process the balanced I/Q signal.

According to an embodiment, a mixer 1261, a third VGA 1262, an LPF 1263, a fourth VGA 1264, and a buffer 1265 may be arranged in a reception path 1250_r in the IFIC 1250. Roles of the third VGA 1262, the LPF 1263, and the fourth VGA 1264 may be the same as or similar to the roles of the third VGA 1254, the LPF 1255, and the fourth VGA 1256 arranged in the transmission path 1250_t. The mixer 1261 may convert an IF signal transferred from the RF IC 1220 into a balanced I/Q signal of a baseband. The buffer 1265 may serve as a buffer when transferring a balanced I/Q signal of a baseband which has passed through the fourth VGA 1264 to the communication processor 1270, thus enabling the IF IC 1250 to stably process the balanced I/Q signal.

According to an embodiment, the communication processor 1270 may include a Tx I/Q digital analog converter (DAC) 1271 and an Rx I/Q analog digital converter 1272. In an embodiment, the Tx I/Q DAC 1271 may convert a digital signal modulated by a modem into a balanced I/Q signal and may transfer the balanced I/Q signal to the IFIC 1250. In an embodiment, the Rx I/Q ADC 1272 may convert a balanced I/Q signal converted by the IFIC 1250 into a digital signal and may transfer the digital signal to the modem. According to various embodiments, the communication processor 1270 may perform multi input multi output (MIMO) or diversity. According to various embodiments, the communication processor 1270 may be implemented as a separate chip or may be implemented as a single chip with another component (e.g., the IFIC 1250).

Figure 13A:
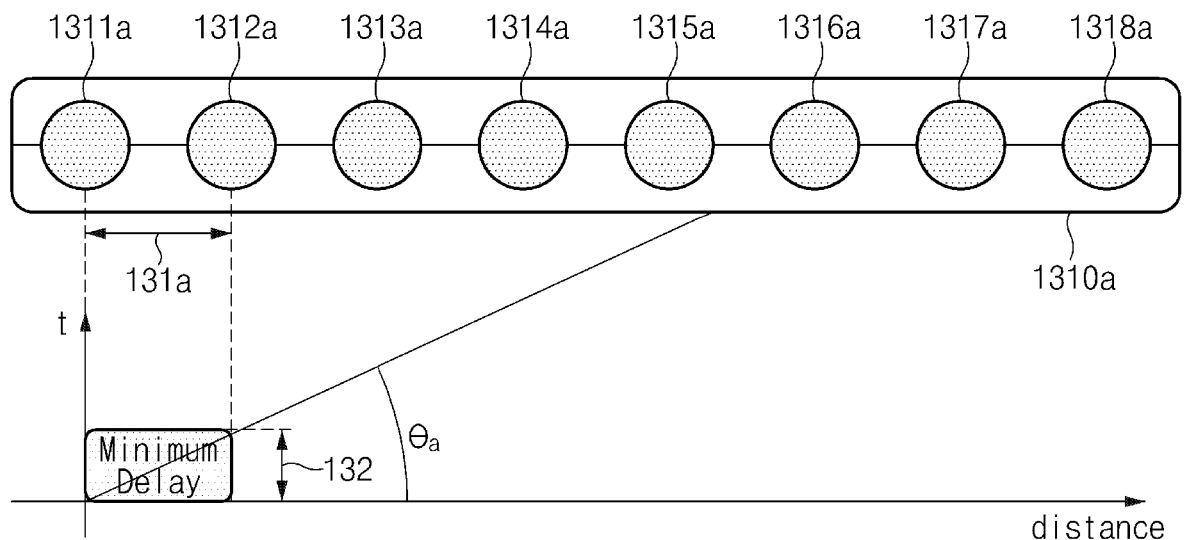
FIG. 13A illustrates a communication device according to an embodiment.
Figure 13B:
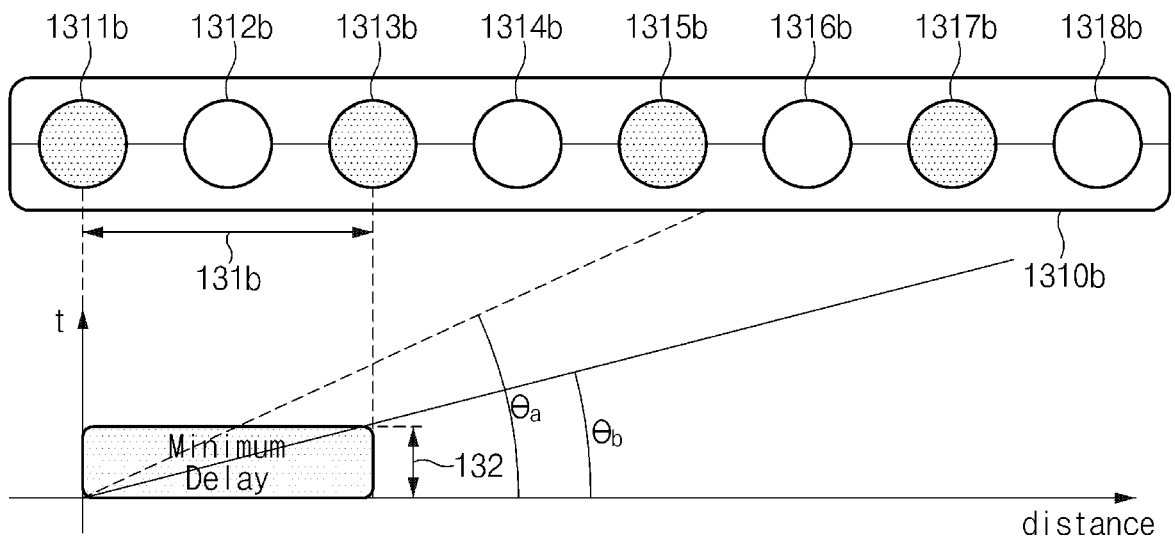
FIG. 13B illustrates a communication device according to another embodiment.
Figure 13C:
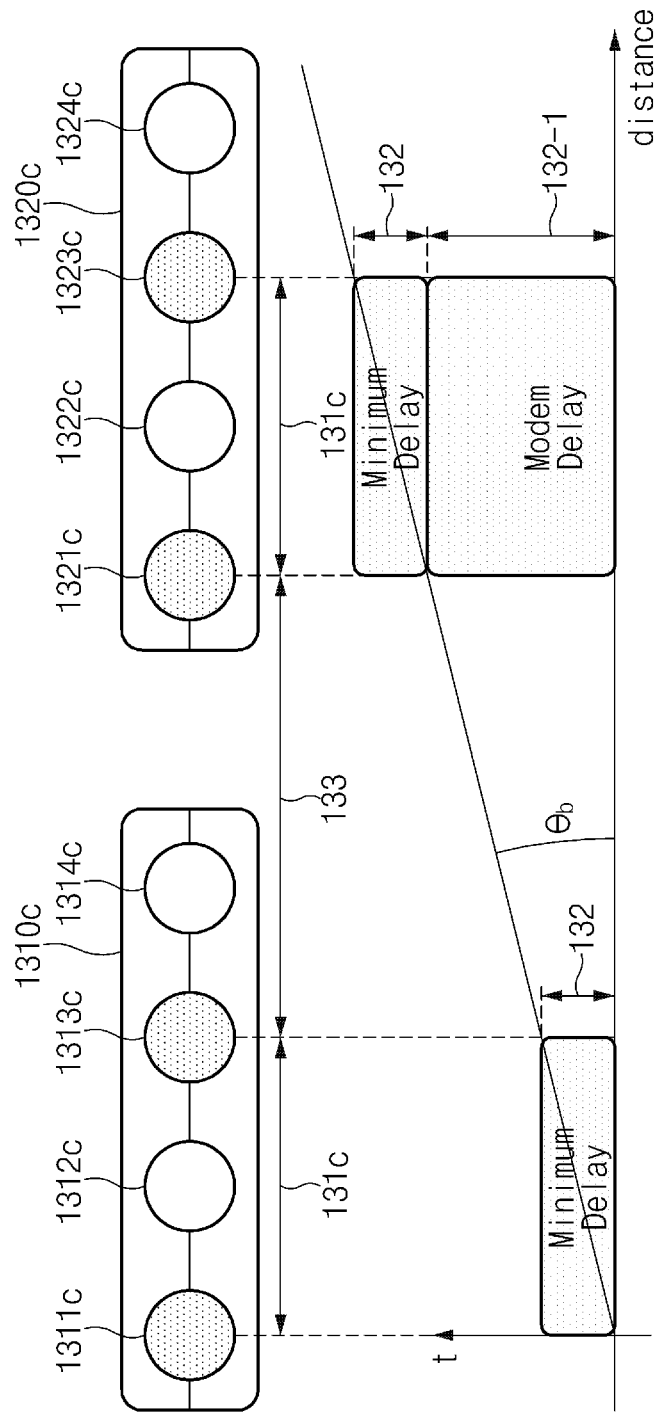
FIG. 13C illustrates a communication device according to another embodiment.

FIG. 13A illustrates a communication device according to an embodiment. FIG. 13B illustrates a communication device according to another embodiment. FIG. 13C illustrates a communication device according to another embodiment.

Referring to FIGS. 13A and 13B, communication devices 1310a and 1310b included in an electronic device (e.g., the electronic device 100 of FIG. 1) may include a plurality of antenna elements 1311a to 1318a and 1311b to 1318b. According to an embodiment, the plurality of antenna elements 1311a to 1318a and 1311b to 1318b may be arranged spaced a first distance 131a apart. According to an embodiment, the electronic device may activate at least a portion of the plurality of antenna elements 1311a to 1318a and 1311b to 1318b. According to an embodiment, as illustrated in FIG. 13A, a distance between two adjacent antenna elements, for example, a first antenna element 1311a and a second antenna element 1312a, among activated antenna elements 1311a to 1318a, may be the first distance 131a. According to another embodiment, as illustrated in FIG. 13B, a distance between two adjacent antenna elements, for example, a first antenna element 1311b and a third antenna element 1313b, among activated antenna elements 1311b, 1313b, 1315b, and 1317b, may be a second distance 131b.

According to an embodiment, the electronic device may transfer specified signals to a plurality of antenna elements in order to form at least one beam. In an embodiment, the specified signals may be configured so as to have a specified phase difference for each antenna element. For example, in FIG. 13A, a first signal transferred to the first antenna element 1311a and a second signal transferred to the second antenna element 1312a may have the specified phase difference, and the second signal transferred to the second antenna element 1312a and a third signal transferred to the third antenna element 1313a may have the specified phase difference. In an embodiment, the direction of a formed beam may be changed according to a magnitude of the specified phase difference.

According to an embodiment, the specified phase difference may have a minimum phase difference or minimum delay time 132 based on performance of a PS (e.g., the PS 1223 of FIG. 12) included in a communication circuit (e.g., the communication circuit 1220 of FIG. 12). The minimum delay time 132 may be regarded as a concept of time achieved by changing the unit of the minimum phase difference from degree or radian to time. In an embodiment, the minimum delay time 132 may determine a minimum unit angle at which the direction of a beam formed by the communication devices 1310a and 1310b may be changed. For example, as the minimum delay time 132 decreases, the communication devices 1310a and 1310b may change the direction of a beam by a smaller angle each time. For another example, as the minimum delay time 132 increases, the communication devices 1310a and 1310b may change the direction of a beam by a larger angle each time. A relationship between the minimum delay time 132 and the minimum unit angle may be expressed as the following equation.

$$\tau = \frac{d\sin\theta}{c} \text{ or } \theta = \sin^{-1}\frac{c\tau}{d}$$

In an embodiment, T may denote the minimum delay time 132, c may denote the speed of light, d may denote a distance (e.g., the first distance 131a or the second distance 131b) between activated antenna elements, and θ may denote the minimum unit angle.

Referring to FIGS. 13A and 13B, the electronic device may change the minimum unit angle of a formed beam using the distance (e.g., the first distance 131a or the second distance 131b) between activated antenna elements. For example, as illustrated in FIG. 13A, the electronic device may control a communication circuit so that the distance between activated antenna elements becomes the first distance 131a. In this case, the minimum unit angle of a formed beam may be a first angle $\theta_a$ according to the minimum delay time 132 of the PS. For another example, as illustrated in FIG. 13B, the electronic device may control a communication circuit so that the distance between activated antenna elements becomes the second distance 131b. In this case, the minimum unit angle of a formed beam may be a second angle $\theta_b$ according to the minimum delay time 132 of the PS. The second angle $\theta_b$ may be smaller than the first angle $\theta_a$.

Referring to FIG. 13c, an electronic device may include a first communication device 1310c and/or a second communication device 1320c. In an embodiment, the first communication device 1310c and the second communication device 1320c may respectively include a plurality of antenna elements 1311c to 1314c and 1321c to 1324c. According to an embodiment, the electronic device may form a beam using at least a portion of the plurality of antenna elements 1311c to 1314c included in the first communication device 1310c and the plurality of antenna elements 1321c to 1324c included in the second communication device 1320c. For example, the electronic device may form a beam by activating a first antenna element 1311c and a third antenna element 1313c included in the first communication device 1310c and a fifth antenna element 1321c and a seventh antenna element 1323c included in the second communication device 1320c.

According to an embodiment, a distance between the first antenna element 1311c and the third antenna element 1313c may be a third distance 131c, and a distance between the fifth antenna element 1321c and the seventh antenna element 1323c may be the third distance 131c. According to an embodiment, a distance between the third antenna element 1313c and the fifth antenna element 1321c may be a fourth distance 133 that is longer than the third distance 131c. In an embodiment, if a separation distance between the first communication device 1310c and the second communication device 1320c increases, the fourth distance 133 may increase.

According to an embodiment, in this case, the minimum unit angle of a formed beam may be the second angle $\theta_b$ as in the case illustrated in FIG. 13B. In an embodiment, a delay time between a third signal transferred to the third antenna element 1313c and a fifth signal transferred to the fifth antenna element 1321c may be determined based on the fourth distance 133. For example, if the fourth distance 133 increases, the delay time between the third signal and the fifth signal may increase. In this case, the increased delay time may be applied from a communication processor (e.g., the communication processor 1270 of FIG. 12), for example, a modem, instead of a PS included in a communication circuit.

Figure 14:
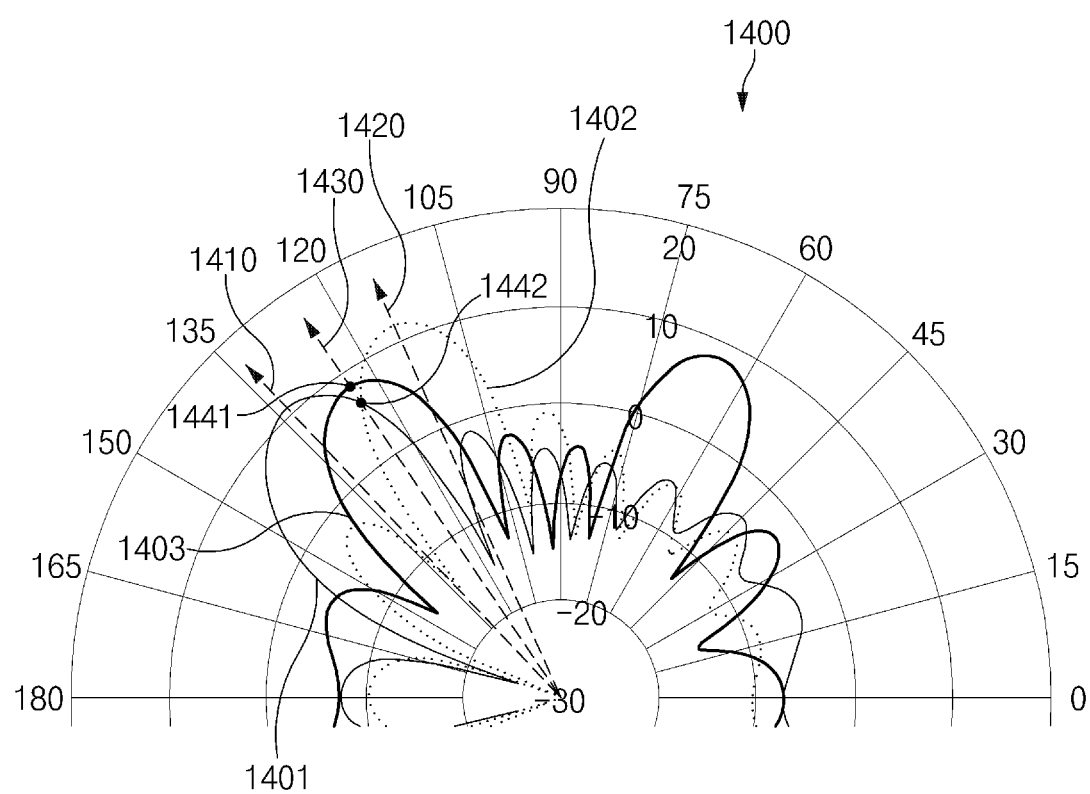
FIG. 14 illustrates shapes of beams formed by a communication device according to various embodiments.

FIG. 14 illustrates shapes of beams formed by a communication device according to various embodiments.

FIG. 14 illustrates a first beam 1401 formed in a first direction 1410, a second beam 1402 formed in a second direction 1420, and a third beam 1403 formed in a third direction 1430. According to an embodiment, the first beam 1401 and the second beam 1402 may be formed when the distance between activated antenna elements is a first distance, and the third beam 1403 may be formed when the distance between activated antenna elements is a second distance. For example, the first beam 1401 and the second beam 1402 may be regarded as beams formed by the communication device 1310a illustrated in FIG. 13A, and the third beam 1403 may be regarded as a beam formed by the communication device 1310 b illustrated in FIG. 13B. According to an embodiment, the first beam 1401 and the second beam 1402 may be regarded as beams of adjacent directions that may be formed by the communication device 1310a illustrated in FIG. 13A. For example, an angle between the first direction 1410 and the second direction 1420 may be the minimum unit angle of the communication device 1310a.

According to an embodiment, a gain of the third beam 1403 for the third direction 1430 may be about 8.31 dB at a first point 1441, and gains of the first beam 1401 and the second beam 1402 for the third direction 1430 may be about 5.81 dB at a second point 1442. Therefore, the third beam 1403 may have a gain that is larger than that of the first beam 1401 or the second beam 1402 by about 2.5 dB for the third direction 1430. However, the communication device forming the third beam 1403 may have a relative gain loss of about 3 dB compared to the communication device forming the first beam 1401 or the second beam 1402 since the number of used RF chains is decreased. Therefore, the communication device forming the third beam 1403 may have an antenna gain that is less than that of the communication device forming the first beam 1401 or the second beam 1402 by about 0.5 dB.

According to an embodiment, when an electronic device communicates with an external electronic device using the third beam 1403 for the third direction 1430, communication performance may slightly deteriorates since the antenna gain decreases by about 0.5 dB, but power consumption may be significantly reduced. For example, if the electronic device communicates with an external electronic device using the third beam 1403 for the third direction 1430, the electronic device may activate fewer antenna elements than when using the first beam 1401 or the second beam 1402 and may reduce power consumption.

Figure 15:
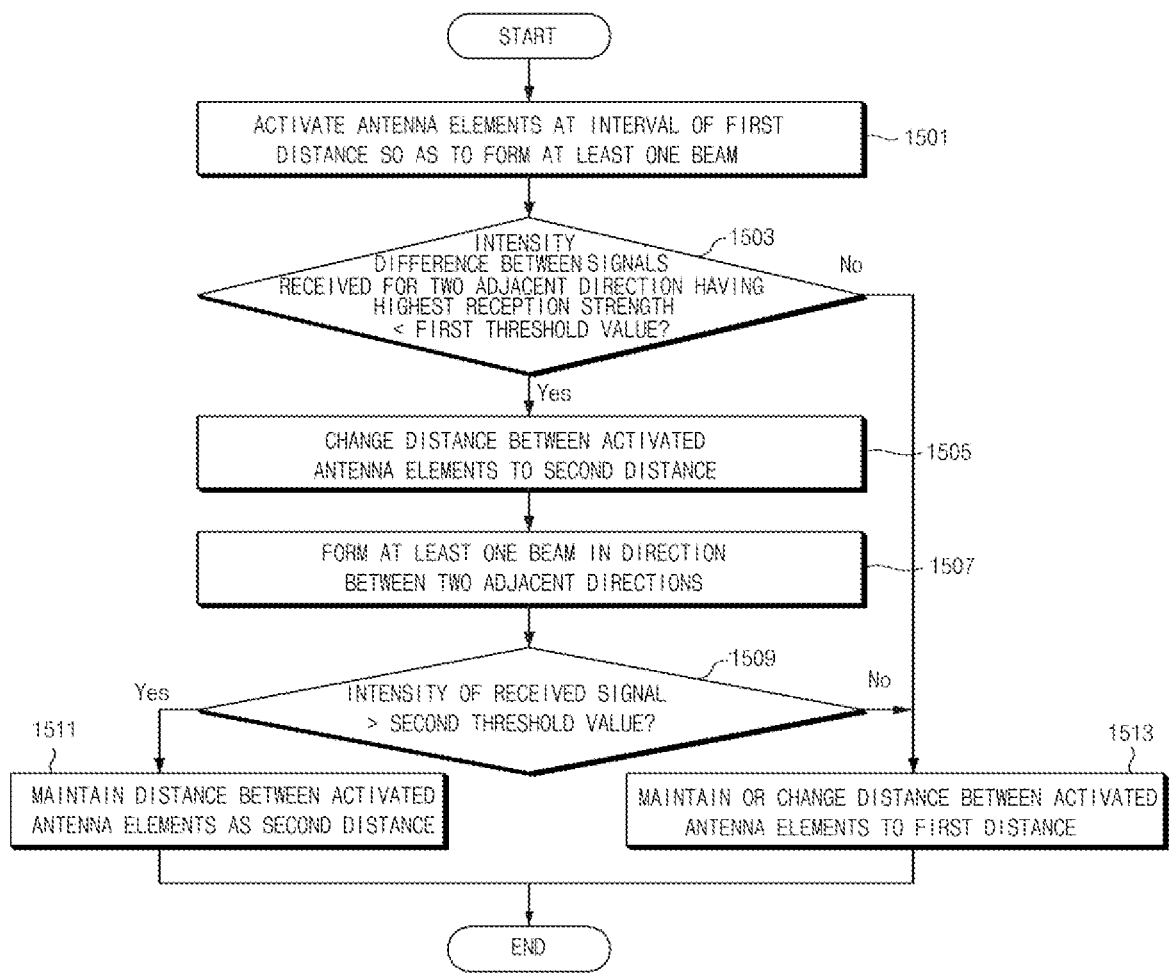
FIG. 15 is a flowchart illustrating a method for an electronic device to receive an RF signal according to an embodiment.

FIG. 15 is a flowchart illustrating a method for an electronic device to receive an RF signal according to an embodiment.

Referring to FIG. 15, a method for an electronic device to receive an RF signal may include operations 1501 to 1513. According to various embodiments, operations 1501 to 1513 may be assumed to be performed by the electronic device 100 of FIG. 1. According to an embodiment, operations 1501 to 1513 may be regarded as operations for receiving an RF signal after the RF signal is sensed for a specified direction according to operations 701 to 705 illustrated in FIG. 7.

In operation 1501, the electronic device may activate antenna elements at an interval of a first distance in order to form at least one beam. For example, the electronic device may control a communication circuit so that the distance between activated antenna elements becomes the first distance 131a in the same manner or similar manner to that of the communication device 1310a illustrated in FIG. 13A.

In operation 1503, the electronic device may determine whether an intensity difference between signals received for two adjacent directions having highest reception sensitivity is less than a first threshold value. For example, when the directions having highest reception sensitivity are the first direction and the second direction illustrated in FIG. 14, the electronic device may determine whether the intensity difference between signals received for the two directions is less than the first threshold value. For example, if the intensity difference between the signals for the two directions is less than the first threshold value, the electronic device may determine that an RF signal is incident in an intermediate direction of the two directions. For another example, if the intensity difference between the signals for the two directions is larger than the first threshold value, the electronic device may determine that an RF signal is incident in a direction closer to one of the two directions.

In various embodiments, the electronic device may perform operation 1505 if the intensity difference is less than the first threshold value, and may perform operation 1513 if the intensity difference is not less than the first threshold value.

In operation 1505, the electronic device may change the distance between activated antenna elements to a second distance. For example, the electronic device may control a communication circuit so that the distance between activated antenna elements becomes the second distance 131b in the same manner or similar manner to that of the communication device 1310b illustrated in FIG. 13B.

In operation 1507, the electronic device may form at least one beam in a direction between the two adjacent directions. For example, the electronic device may form at least one beam in a third direction between the first direction and the second direction as illustrated in FIG. 14.

In operation 1509, the electronic device may determine whether an intensity of a signal received using the beam formed in operation 1507 is larger than a second threshold value. For example, if the intensity of the received signal is larger than the second threshold value, the electronic device may determine that an RF signal is incident in a direction of the beam formed in operation 1507. For another example, if the intensity of the received signal is less than the second threshold value, the electronic device may determine that an RF signal is incident in a direction adjacent to one of the two directions of operation 1503.

In various embodiments, the electronic device may perform operation 1511 if the intensity of the received signal is larger than the second threshold value, and may perform operation 1513 if the intensity of the received signal is less than the second threshold value.

In operation 1511, the electronic device may maintain the distance between activated antenna elements as the second distance. In an embodiment, the electronic device may form a beam in the direction determined in operation 1507 using the activated antenna elements, and may receive an RF signal.

In operation 1513, the electronic device may maintain or change the distance between activated antenna elements to the first distance. For example, since the electronic device determines that an RF signal is incident in a direction closer to one of the two directions in operation 1503, the electronic device is not required to form a beam in a direction between the two directions, and may maintain the distance between activated antenna elements as the first distance. For another example, since the electronic device determines that an RF signal is incident in a direction closer to one of the two directions in operation 1509, the electronic device is not required to form a beam in a direction between the two directions, and may change the distance between activated antenna elements to the first distance.

According to an embodiment, through the process illustrated in FIG. 15, the electronic device may confirm a direction in which an RF signal is received, and may transmit a signal in the confirmed direction. For example, the electronic device may transmit a signal to a network based on the distance between antenna elements set in operation 1511 or operation 1513.

An electronic device (e.g., the electronic device 100 of FIG. 1A) according to various embodiments of the present disclosure may include an antenna array (e.g., the antenna array 220 of FIG. 2A) including a plurality of antenna elements arranged at an interval of a first distance (e.g., the first distance 21 of FIG. 2B) and a communication circuit (e.g., the communication circuit 1130 of FIG. 11) electrically connected to the antenna array, wherein the communication circuit may be configured to feed a first antenna element and a second antenna element spaced a second distance (e.g., the second distance 31b of FIG. 3B) apart from the first antenna element among the plurality of antenna elements, form a beam including a main lobe (e.g., the main lobe 311b of FIG. 3B) and a grating lobe (e.g., the grating lobe 312b of FIG. 3B) that forms a specified angle with the main lobe using the first antenna element and the second antenna element, and sense an RF signal that is incident externally using the formed beam.

According to an embodiment, the antenna array may correspond to a first antenna array (e.g., the first antenna array 620 of FIG. 6C), the beam may correspond to a first beam, and the electronic device may further include a second antenna array (e.g., the second antenna array of FIG. 6C), which is arranged spaced a third distance (e.g., the third distance 63c of FIG. 6C) apart from the first antenna array and includes a plurality of antenna elements arranged at an interval of the first distance, wherein the communication circuit may be configured to feed a third antenna element and a fourth antenna element spaced the second distance apart from the third antenna element among the plurality of antenna elements included in the second antenna array, form a second beam which is different from the first beam and includes a main lobe and a grating lobe that forms a specified angle with the main lobe using the third antenna element and the fourth antenna element, and sense the RF signal using the first beam and the second beam.

In an embodiment, the third distance may be substantially five times a wavelength of the RF signal.

According to an embodiment, the communication circuit may feed the first antenna element and a third antenna element spaced the first distance apart from the first antenna element among the plurality of antenna elements upon sensing the RF signal, re-form a beam in a direction of the main lobe of the formed beam using the first antenna element and the third antenna element, and determine a direction of the RF signal as the direction of the main lobe when the RF signal is sensed using the re-formed beam.

In an embodiment, the communication circuit may receive the RF signal in the determined direction using the antenna array.

In an embodiment, when the RF signal is not sensed using the re-formed beam, the communication circuit may determine the direction of the RF signal as a direction of the grating lobe of the formed beam, and receive the RF signal in the determined direction using the antenna array.

In an embodiment, the communication circuit may divide the sensed RF signal into a main lobe direction component and a grating lobe direction component, determine a direction of the RF signal based on the divided components, and receive the RF signal in the determined direction using the antenna array.

In an embodiment, the communication circuit may determine the direction of the RF signal as a direction of the main lobe when an intensity of the main lobe direction component is higher than that of the grating lobe direction component.

In an embodiment, the communication circuit may determine the direction of the RF signal as a direction of the grating lobe when an intensity of the main lobe direction component is lower than that of the grating lobe direction component.

According to an embodiment, the first distance may be substantially the same as half of a wavelength of the RF signal. According to an embodiment, the second distance may be substantially the same as a wavelength of the RF signal. According to an embodiment, the second distance may be substantially 1.5 times a wavelength of the RF signal. According to an embodiment, the specified angle may be substantially 90 degrees.

According to an embodiment, the communication circuit may change the formed beam by the specified angle each time in order to sense the RF signal.

A method for sensing an RF signal according to various embodiments of the present disclosure may include feeding a first antenna element and a second antenna element spaced a second distance apart from the first antenna element among a plurality of antenna elements included in an antenna array, forming a beam including a main lobe and a grating lobe that forms a specified angle with the main lobe using the first antenna element and the second antenna element, and sensing an RF signal that is incident externally using the formed beam.

According to an embodiment, the antenna array may correspond to a first antenna array, the beam may correspond to a first beam, and the method may further include feeding a third antenna element and a fourth antenna element spaced the second distance apart from the third antenna element among a plurality of antenna elements included in a second antenna array, and forming a second beam which is different from the first beam and includes a main lobe and a grating lobe that forms a specified angle with the main lobe using the third antenna element and the fourth antenna element, wherein the sensing of the RF signal may include sensing the RF signal using the first beam and the second beam.

According to an embodiment, the method may further include feeding the first antenna element and a third antenna element spaced the first distance apart from the first antenna element among the plurality of antenna elements upon sensing the RF signal, re-forming a beam in a direction of the main lobe of the formed beam using the first antenna element and the third antenna element, and determining a direction of the RF signal as the direction of the main lobe when the RF signal is sensed using the re-formed beam.

In an embodiment, the method may further include receiving the RF signal in the determined direction using the antenna array.

According to an embodiment, the method may further include determining the direction of the RF signal as a direction of the grating lobe of the formed beam when the RF signal is not sensed using the re-formed beam, and receiving the RF signal in the determined direction using the antenna array.

According to an embodiment, the method may further include dividing the sensed RF signal into a main lobe direction component and a grating lobe direction component, determining a direction of the RF signal based on the divided components, and receiving the RF signal in the determined direction using the antenna array.

An electronic device according to various embodiments of the present disclosure may include a housing, a wireless communication circuit configured to transmit and/or receive a signal having a first wavelength using beamforming, and an antenna array arranged inside the housing and/or at a portion thereof and electrically connected to the wireless communication circuit, wherein the antenna array includes a first antenna element, a second antenna element, and a third antenna element, which are sequentially aligned in one direction, wherein two adjacent antenna elements among the first to third antenna elements are spaced a distance that is equal to or shorter than the first wavelength apart from each other, and wherein the wireless communication circuit may be further configured to perform first receive beam sweeping using the first antenna element and the third antenna element other than the second antenna element, and perform initial beam training by performing second receive beam sweeping using the second antenna element and either the first or third antenna element after performing the first receive beam sweeping.

According to an embodiment, the wireless communication circuit may be configured to sense a synchronization signal during the first receive beam sweeping, and report an ID of a transmission beam when the synchronization signal is sensed from the first receive beam sweeping.

In an embodiment, the wireless communication circuit may be configured to perform the second receive beam sweeping after reporting the ID of the transmission beam. In an embodiment, the wireless communication circuit may be configured to sense a transmit/receive point (TRP) beam during the second receive beam sweeping. In an embodiment, the wireless communication circuit may be further configured to initiate communication at least partially based on a direction of the sensed TRP beam.

According to embodiments of the present disclosure, an electronic device may efficiently sense a direction in which a millimeter wave signal is incident. For example, the electronic device may more quickly sense the direction in which the signal is incident, and may also reduce power consumption.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   an antenna array including a plurality of antenna elements arranged at an interval of a first distance; and
   a communication circuit electrically connected to the antenna array,
   wherein the communication circuit is configured to:
      feed a first antenna element and a second antenna element spaced a second distance apart from the first antenna element among the plurality of antenna elements, wherein the second distance is greater than the first distance;
      form a first beam including a main lobe and a grating lobe that forms a specified angle with the main lobe using the first antenna element and the second antenna element;
      sense an RF signal that is incident externally using the first beam;
      in response sensing the RF signal, form a second beam in a direction of the main lobe using the first antenna element and a third antenna element spaced the first distance from the first antenna element among the plurality of antenna elements;
      when the RF signal is sensed using the second beam, receive the RF signal with a beam formed in the direction of the main lobe by activating at least a part of the plurality of antenna elements; and
      when the RF signal is not sensed using the second beam, receive the RF signal with a beam formed in a direction of the grating lobe by activating at least a part of the plurality of antenna elements.

2. The electronic device of claim 1,
   wherein the antenna array corresponds to a first antenna array,
   the electronic device further comprises a second antenna array, which is arranged to be spaced a third distance apart from the first antenna array and includes a plurality of antenna elements arranged at the interval of the first distance, wherein the third distance is the same or greater than the second distance, and
   wherein the communication circuit is configured to:
      feed a fourth antenna element and a fifth antenna element spaced the second distance apart from the fourth antenna element among the plurality of antenna elements included in the second antenna array,
      form a third beam which is different from the first beam and includes another main lobe and another grating lobe that forms another specified angle with the other main lobe by feeding the fourth antenna element and the fifth antenna element, and
      sense the RF signal using the first beam and the third beam.

3. The electronic device of claim 2, wherein the third distance is substantially five times a wavelength of the RF signal.

4. The electronic device of claim 1, wherein the communication circuit is configured to:
   determine a direction of the RF signal as the direction of the main lobe when the RF signal is sensed using the second beam.

5. The electronic device of claim 4, wherein the communication circuit is configured to receive the RF signal in the determined direction using all of the plurality of antenna elements of the antenna array.

6. The electronic device of claim 4, wherein the communication circuit is configured to:
   determine the direction of the RF signal as the direction of the grating lobe of the first beam when the RF signal is not sensed using the second beam.

7. The electronic device of claim 1, wherein the first distance is substantially the same as half of a wavelength of the RF signal.

8. The electronic device of claim 1, wherein the second distance is substantially the same as a wavelength of the RF signal.

9. The electronic device of claim 1, wherein the second distance is substantially 1.5 times a wavelength of the RF signal.

10. The electronic device of claim 1, wherein the specified angle is substantially 90 degrees.

11. The electronic device of claim 1, wherein the communication circuit is configured to change the first beam by the specified angle each time in order to sense the RF signal.

12. A method for sensing an RF signal, the method comprising:
   feeding a first antenna element and a second antenna element spaced a second distance apart from the first antenna element among a plurality of antenna elements included in an antenna array, wherein the plurality of antenna elements are arranged at an interval of a first distance and the second distance is greater than the first distance;

forming a first beam including a main lobe and a grating lobe that forms a specified angle with the main lobe by feeding the first antenna element and the second antenna element;

sensing an RF signal that is incident externally using the first beam;

in response sensing the RF signal, forming a second beam in a direction of the main lobe using the first antenna element and a third antenna element spaced the first distance from the first antenna element among the plurality of antenna elements;

when the RF signal is sensed using the second beam, receiving the RF signal with a beam formed in the direction of the main lobe by activating at least a part of the plurality of antenna elements; and when the RF signal is not sensed using the second beam, receiving the RF signal with a beam formed in a direction of the grating lobe by activating at least a part of the plurality of antenna elements.

* * * * *